(12) United States Patent  
Koishi

(10) Patent No.: US 8,379,106 B2
(45) Date of Patent: Feb. 19, 2013

(54) IMAGE PROCESSING DEVICE, IMAGE PROCESSING METHOD AND PROGRAM PRODUCT

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 650 days.

(21) Appl. No.: 12/385,398

(22) Filed: Apr. 7, 2009

(65) Prior Publication Data

US 2009/0195670 A1    Aug. 6, 2009

Related U.S. Application Data

(63) Continuation-in-part of application No. PCT/JP2007/069842, filed on Oct. 11, 2007.

(30) Foreign Application Priority Data

| Oct. 11, 2006 | (JP) | 2006-277745 |
| Oct. 23, 2006 | (JP) | 2006-287918 |
| Nov. 24, 2006 | (JP) | 2006-317391 |
| Nov. 24, 2006 | (JP) | 2006-317748 |

(51) Int. Cl.
*H04N 9/73* (2006.01)

(52) U.S. Cl. .......... 348/223.1; 348/79; 348/80; 382/167

(58) Field of Classification Search .......... 348/79, 348/80, 223.1; 382/167
See application file for complete search history.

(56) References Cited

U.S. PATENT DOCUMENTS

| 5,920,358 A | 7/1999 | Takemura |
| 6,259,473 B1 * | 7/2001 | Iko et al. ............ 348/80 |
| 6,373,531 B1 | 4/2002 | Hidaka et al. |
| 6,560,358 B1 | 5/2003 | Tsukada |
| 6,856,354 B1 | 2/2005 | Ohsawa |
| 6,987,519 B2 | 1/2006 | Kumada et al. |
| 7,120,295 B2 * | 10/2006 | Edge et al. ............ 382/162 |
| 7,605,823 B2 * | 10/2009 | Stokes et al. ............ 345/589 |
| 7,830,566 B2 | 11/2010 | Yamada et al. |
| 8,026,953 B2 * | 9/2011 | Lammers et al. .......... 348/223.1 |
| 2001/0011966 A1 | 8/2001 | Iwane et al. |

(Continued)

FOREIGN PATENT DOCUMENTS

| EP | 0 767 445 A2 | 4/1997 |
| JP | A-07-222196 | 8/1995 |

(Continued)

OTHER PUBLICATIONS

Apr. 14, 2011 Office Action issued in copending U.S. Appl. No. 12/312,603.

(Continued)

*Primary Examiner* — Anthony J Daniels
(74) *Attorney, Agent, or Firm* — Oliff & Berridge, PLC

(57) ABSTRACT

An image processing device that reproduces under a second observation condition an appearance of a color of a subject as perceived under a first observation condition, includes: a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation condition in addition to information related to an illuminating light source used under the one observation condition; and a color conversion unit that executes color conversion to convert the first image data to second image data to be used to reproduce, under the second observation condition, the appearance of the color of the subject as perceived under the first observation condition, based upon the characteristic quantity having been calculated.

33 Claims, 16 Drawing Sheets

U.S. PATENT DOCUMENTS

| | | | |
|---|---|---|---|
| 2002/0118210 A1 | 8/2002 | Yuasa et al. | |
| 2004/0042653 A1 | 3/2004 | Hu | |
| 2004/0201727 A1 | 10/2004 | Ichikawa et al. | |
| 2005/0220340 A1* | 10/2005 | Nakabayashi et al. | 382/167 |
| 2011/0013833 A1* | 1/2011 | Hoof et al. | 382/167 |

FOREIGN PATENT DOCUMENTS

| | | |
|---|---|---|
| JP | A-08-046989 | 2/1996 |
| JP | A-09-093451 | 4/1997 |
| JP | A-09-102882 | 4/1997 |
| JP | A-09-219800 | 8/1997 |
| JP | A-11-055688 | 2/1999 |
| JP | A-2000-050086 | 2/2000 |
| JP | A-2000-113174 | 4/2000 |
| JP | A-2000-175062 | 6/2000 |
| JP | A-2001-143065 | 5/2001 |
| JP | A-2003-018416 | 1/2003 |
| JP | A-2003-018420 | 1/2003 |
| JP | B-3634633 | 1/2005 |
| JP | B2-3635673 | 4/2005 |
| WO | WO 2008/050761 A1 | 5/2008 |

OTHER PUBLICATIONS

Office Action issued Oct. 14, 2011 in U.S. Appl. No. 12/312,603, filed May 19, 2009 to Erika Koishi.

Koichi, E., U.S. Appl. No. 12/312,603, filed May 19, 2009.

Kanematsu et al., "Dependency of D-factor, the degree of adaptation factor, on hue," Color Forum Japan 2006, pp. 81-84, Nov. 27-29, 2006.

"A Colour Appearance Model for Colour Management Systems: CIECAM02," International Commission on Illumination, pp. 6-7.

Office Action issued in corresponding European Patent Application No. 07829580.5 dated Mar. 10, 2011.

N. Katoh, "Practical Method for Appearance Match between Soft and Hard Copy," Proceedings of the International Society for Optical Engineering, vol. 2170, Feb. 7, 1994, pp. 170-181.

Search Report issued in European Patent Application No. 07829580. 5, dated Jul. 21, 2010.

Kanematsu et al., "http://www.ren-associates.com/ColorForumJ/program/home_jp.html", Oct. 16, 2006, p. 3, lines 17-18.

Nov. 8, 2011 Japanese Office Action issued in Japanese Patent Application No. 2008-538752.

Oct. 1, 2012 Office Action issued in U.S. Appl. No. 12/312,603.

* cited by examiner

FIG.8

| SELECTION RESULTS PROVIDED FROM 47 / SELECTION RESULTS PROVIDED FROM 46 | 1. IMAGE TO BE OBSERVED IN COMBINATION WITH MICROSCOPE OBSERVATION | 2. IMAGE TO BE OBSERVED SIMPLY AS MONITOR DISPLAY IMAGE OR IMAGE TO BE SAVED |
|---|---|---|
| A. DIM (CONFORMING TO sRGB ENVIRONMENT) | Matrix1 | Matrix2 |
| B. BRIGHT ROOM | Matrix3 | Matrix4 |

_US 8,379,106 B2_

IMAGE PROCESSING DEVICE, IMAGE PROCESSING METHOD AND PROGRAM PRODUCT

This application is a continuation in part of International Application No. PCT/JP2007/069842 filed Oct. 11, 2007.

INCORPORATION BY REFERENCE

The disclosures of the following priority applications are herein incorporated by reference: Japanese Patent Application No. 2006-277745 filed Oct. 11, 2006; Japanese Patent Application No. 2006-287918 filed Oct. 23, 2006; Japanese Patent Application No. 2006-317391 filed Nov. 24, 2006; Japanese Patent Application No. 2006-317748 filed Nov. 24, 2006; and International Application No. PCT/JP2007/069842 filed Oct. 11, 2007.

BACKGROUND OF THE INVENTION

1. Field of the Invention

The present invention relates to an image processing device, an image processing method and an image processing program with which image data of an image captured under a given imaging condition are converted to image data accurately reproducing the appearance of the color in correspondence to an observation condition.

2. Description of Related Art

Various chromatic adaptation transform models for reproducing the appearance of the color of an image, captured under a given imaging condition, in correspondence to an observation condition different from the imaging condition by taking into consideration the chromatic adaptation characteristics of human visual perception, have been proposed to date. One of the viewing conditions that affect the appearance of color is the white point to which the visual perception of the person observing a subject or an image has adapted. The varying viewing conditions may be factored into the chromatic adaptation transform by converting, based upon the white point of the light source illuminating the subject, the image data to data in a color space not dependent upon the device, and then converting the data to an output image based upon the white point of the light source illuminating the image to be observed.

In addition, Japanese Laid Open Patent Publication No. H9-93451 and Japanese Patent Publication No. 3635673 each disclose a technology whereby the adapted white point for CRT observation is determined by taking into consideration the white point of the ambient light surrounding the CRT as well as the white point of the CRT when executing color conversion for a CRT display image to a printed image.

SUMMARY OF THE INVENTION

However, whenever a person looks back and forth at subject images rendered in different viewing conditions, their adaptation to first viewing conditions is bound to affect observation of the output image in second viewing conditions and, for this reason, the color cannot be reproduced accurately simply by taking into consideration the lighting conditions and the ambient light conditions as the second viewing conditions. The adaptation to the first viewing conditions tends to affect the observation in the second viewing conditions to a greater extent particularly if the brightness in the first viewing condition is high.

According to the 1st aspect of the present invention, an image processing device that reproduces under a second observation condition an appearance of a color of a subject as perceived under a first observation condition, comprises: an image data acquisition unit that obtains first image data created by capturing a subject image under the first observation condition; a first illumination condition acquisition unit that obtains information related to a first illuminating light source used under the first observation condition; a second illumination condition acquisition unit that obtains information related to a second illuminating light source used under the second observation condition; a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation condition in addition to information related to an illuminating light source used under the one observation condition; and a color conversion unit that executes color conversion to convert the first image data to second image data to be used to reproduce, under the second observation condition, the appearance of the color of the subject as perceived under the first observation condition, based upon the characteristic quantity having been calculated.

According to the 2nd aspect of the present invention, an image processing device that reproduces under a second observation condition an appearance of a color of an image as perceived under a first observation condition, comprises: an image data acquisition unit that obtains first image data to be used to provide the image under the first observation condition; a first illumination condition acquisition unit that obtains information related to a first illuminating light source used under the first observation condition; a second illumination condition acquisition unit that obtains information related to a second illuminating light source used under the second observation condition; a characteristic quantity calculation unit that calculates a characteristic quantity related to a state of visual perception adaptation under an observation condition that is at least one observation condition of the first observation condition and the second observation condition by taking into consideration information related to the illuminating light source used under another observation condition in addition to information related to the illuminating light source used under the one observation condition; and a color conversion unit that executes color conversion to convert the first image data to second image data to be used to reproduce, under the second observation condition, the appearance of the color of the image as perceived under the first observation condition based upon the characteristic quantity having been calculated.

According to the 3rd aspect of the present invention, in the image processing device according to the 1st aspect, it is preferred that: the characteristic quantity is an adapted white point; and the characteristic quantity calculation unit is an adapted white point calculation unit that calculates a white point in case that visual perception is adapted under an observation condition that is at least one of the first observation condition and the second observation condition by taking into consideration the information related to the illuminating light source used under the other observation condition in addition to the information related to the illuminating light source used under the one observation condition.

According to the 4th aspect of the present invention, in the image processing device according to the 3rd aspect, it is preferred that: the adapted white point calculation unit calculates as the adapted white point at least a second adapted white point in case that visual perception is adapted under the second observation condition by taking into consideration the information related to the first illuminating light source having been obtained in addition to the information related to the second illuminating light source having been obtained; and the color conversion unit executes color conversion to convert the first image data to the second image data based upon the second adapted white point thus calculated.

According to the 5th aspect of the present invention, in the image processing device according to the 3rd aspect, it is preferred that; the adapted white point calculation unit calculates, as the adapted white point, a first adapted white point in case that visual perception is adapted under the first observation condition by taking into consideration the information related to the second illuminating light source in addition to the information related to the first illuminating light source having been obtained, and a second adapted white point in case that visual perception is adapted under the second observation condition respectively by taking into consideration the information related to the first illuminating light source in addition to the information related to the second illuminating light source having been obtained; and the color conversion unit executes color conversion to convert the first image data to the second image data based upon the first adapted white point and the second adapted white point.

According to the 6th aspect of the present invention, in the image processing device according to the 1st aspect, it is preferred that: the information related to the first illuminating light source includes information related to a color temperature of the first illuminating light source; and the information related to the second illuminating light source includes information related to a color temperature of the second illuminating light source.

According to the 7th aspect of the present invention, in the image processing device according to the 6th aspect, it is preferred that: the information related to the first illuminating light source further includes information indicating a luminance of the first illuminating light source; and the information related to the second illuminating light source further includes information indicating a luminance of the second illuminating light source.

According to the 8th aspect of the present invention, in the image processing device according to the 1st aspect, it is preferred that the characteristic quantity calculation unit adjusts a ratio, with which the information related to the illuminating light source used under the other observation condition is taken into consideration relative to the information related to the illuminating light source used under the one observation condition, in correspondence to a luminance of the first illuminating light source used under the first observation condition and a luminance of the second illuminating light source used under the second observation condition.

According to the 9th aspect of the present invention, in the image processing device according to the 1st aspect, it is preferred that: the image processing device further comprises an observation method input unit to which information related to a time interval elapsing between observation conducted under the first observation condition and observation conducted under the second observation condition is input; and the characteristic quantity calculation unit adjusts a ratio, with which the information related to the illuminating light source used under the other observation condition is taken into consideration relative to the information related to the illuminating light source used under the one observation condition, in correspondence to the information input to the observation method input unit.

According to the 10th aspect of the present invention, in the image processing device according to the 3rd aspect, it is preferred that the adapted white point calculation unit adjusts a ratio, with which the information related to the illuminating light source used under the other observation condition is taken into consideration relative to the information related to the illuminating light source used under the one observation condition, in correspondence to a luminance of the first illuminating light source used under the first observation condition and a luminance of the second illuminating light source used under the second observation condition.

According to the 11th aspect of the present invention, in the image processing device according to the 3rd aspect, it is preferred that: the image processing device further comprises an observation method input unit to which information related to a time interval elapsing between observation conducted under the first observation condition and observation conducted under the second observation condition is input; and the adapted white point calculation unit adjusts a ratio, with which the information related to the illuminating light source used under the other observation condition taken into consideration relative to the information related to the illuminating light source used under the one observation condition, in correspondence to the information input to the observation method input unit.

According to the 12th aspect of the present invention, in the image processing device according to the 11th aspect, it is preferred that the observation method input unit selects one of at least two modes that are a long time interval mode and a short time interval mode, with regard to the time interval elapsing between the observation conducted under the first observation condition and the observation conducted under the second observation condition, in correspondence to the information input to the observation method input unit.

According to the 13th aspect of the present invention, in the image processing device according to the 12th aspect, it is preferred that: the adapted white point calculation unit increases the ratio, with which the information related to the illuminating light source used under the other observation condition is taken into consideration relative to the information related to the illuminating light source used under the one observation condition, if the short time interval mode is selected via the observation method input unit; and the adapted white point calculation unit reduces the ratio, with which the information related to the illuminating light source used under the other observation condition is taken into consideration relative to the information related to the illuminating light source used under the one observation condition, if the long time interval mode is selected via the observation method input unit.

According to the 14th aspect of the present invention, in the image processing device according to the 12th aspect, it is preferred that the observation method input unit selects one of at least two modes that are an image save mode selected to save the second image data and a combination of observation mode selected to conduct observation under the first observation condition and observation under the second observation condition in combination, assumes that the long time interval mode is selected if the image save mode has been selected and assumes that the short time interval mode is selected if the combination observation mode is selected.

According to the 15th aspect of the present invention, in the image processing device according to the 1st aspect, it is preferred that: the information related to the first illuminating light source includes information related to a light source that directly illuminates the subject and information related to a light source that illuminates an environment of the subject; and the information related to the second illuminating light source includes information related to a light source of a display device at which the second image data are displayed and information related to a light source that illuminates an environment of the display device.

According to the 16th aspect of the present invention, in the image processing device according to the 2nd aspect, it is preferred that: the image processing device further comprises a first display device at which the image is displayed under the first observation condition, and a second display device at which a reproduced image is displayed under the second observation condition; the information related to the first illuminating light source includes information related to a light source of the first display device and information related to a light source that illuminates an environment of the first display device; and the information related to the second illuminating light source includes information related to a light source of the second display device and information related to a light source that illuminates an environment of the second display device.

According to the 17th aspect of the present invention, in the image processing device according to the 3rd aspect, it is preferred that: the image processing device further comprises a time count unit that measures a length of time over which observation is continuously conducted under the second observation condition; the adapted white point calculation unit adjusts a ratio, with which the information related to the illuminating light source used under the other observation condition is taken into consideration relative to the information related to the illuminating light source used under the one observation condition, in correspondence to the length of time over which an image is continuously observed under the second observation condition; and the color conversion unit adjusts the second image data continuously based upon the adapted white point that changes continuously in correspondence to the length of time over which the image is observed under the second observation condition.

According to the 18th aspect of the present invention, in the image processing device according to the 17th aspect, it is preferred that: the time count unit also measures a length of time over which observation is continuously conducted under the first observation condition; and the adapted white point calculation unit adjusts the ratio, with which the information related to the illuminating light source used under the other observation condition is taken into consideration relative to the information related to the illuminating light source used under the one observation condition, in correspondence to the length of time over which observation is conducted under the first observation condition and the length of time over which the image is continuously observed under the second observation condition.

According to the 19th aspect of the present invention, in the image processing device according to the 1st aspect, it is preferred that at least one of the first illumination condition acquisition unit and the second illumination condition acquisition unit selects one of a plurality of predicted ambient light conditions.

According to the 20th aspect of the present invention, in the image processing device according to the 3rd aspect, it is preferred that the color conversion unit uses a value related to the calculated adapted white point for a component of a color conversion matrix used when executing the color conversion to convert the first image data to the second image data.

According to the 21st aspect of the present invention, in the image processing device according to the 3rd aspect, it is preferred that: the image processing device further comprises an adaptation factor calculation unit that calculates an adaptation factor indicating an extent of adaptation to an illumination condition adopted under the first observation condition; the adapted white point calculation unit calculates the adapted white point in case that visual perception is adapted under the first observation condition by using the adaptation factor calculated by the adaptation factor calculation unit; and the adaptation factor calculation unit adjusts the adaptation factor in correspondence to a color of a conversion target pixel.

According to the 22nd aspect of the present invention, in the image processing device according to the 3rd aspect, it is preferred that: the image processing device further comprises an adaptation factor calculation unit that calculates an adaptation factor indicating an extent of adaptation to an illumination condition adopted under the second observation condition; the adapted white point calculation unit calculates the adapted white point in case that visual perception is adapted under the second observation condition by using the adaptation factor calculated by the adaptation factor calculation unit; and the adaptation factor calculation unit adjusts the adaptation factor in correspondence to a color of a conversion target pixel.

According to the 23rd aspect of the present invention, in the image processing device according to the 3rd aspect, it is preferred that: the image processing device further comprises an adaptation factor calculation unit that calculates an adaptation factor indicating an extent of adaptation to an illumination condition adopted under the first observation condition and an adaptation factor indicating an extent of adaptation to an illumination condition adopted under the second observation condition; the adapted white point calculation unit calculates the adapted white points respectively in cases that visual perception is adapted under the first observation condition and the second observation condition, by using the adaptation factors calculated by the adaptation factor calculation unit; and the adaptation factor calculation unit adjusts the adaptation factors in correspondence to a color of a conversion target pixel.

According to the 24th aspect of the present invention, in the image processing device according to the 3rd aspect, it is preferred that: the image processing device further comprises an adaptation factor calculation unit that calculates an adaptation factor indicating an extent of adaptation to an illumination condition adopted under the first observation condition; the adapted white point calculation unit calculates the adapted white point in case that visual perception is adapted under the first observation condition by using the adaptation factor calculated by the adaptation factor calculation unit; and the adaptation factor calculation unit analyzes a color distribution in the input image and adjusts the adaptation factor based upon the color distribution determined through analysis.

According to the 25th aspect of the present invention, in the image processing device according to the 3rd aspect, it is preferred that: the image processing device further comprises an adaptation factor calculation unit that calculates an adaptation factor indicating an extent of adaptation to an illumination condition adopted under the second observation condition; the adapted white point calculation unit calculates the adapted white point in case that visual perception is adapted under the second observation condition by using the adaptation factor calculated by the adaptation factor calculation unit; and the adaptation factor calculation unit analyzes a color distribution in the input image and adjusts the adaptation factor based upon the color distribution determined through analysis.

According to the 26th aspect of the present invention, in the image processing device according to the 3rd aspect, it is preferred that: the image processing device further comprises an adaptation factor calculation unit that calculates an adaptation factor indicating an extent of adaptation to an illumination condition adopted under the first observation condition and an adaptation factor indicating an extent of adaptation to an illumination condition adopted under the second observation condition; the adapted white point calculation unit calculates the adapted white points respectively in cases that visual perception is adapted under the first observation condition and the second observation condition by using the adaptation factors calculated by the adaptation factor calculation unit; and the adaptation factor calculation unit analyzes a color distribution in the input image and adjusts the adaptation factors based upon the color distribution determined through analysis.

According to the 27th aspect of the present invention, an image processing device that reproduces under a second observation condition an appearance of a color of a subject as perceived under a first observation condition, comprises: an image data acquisition unit that obtains first image data created by capturing a subject image under the first observation condition; a color conversion unit that executes color conversion to convert the first image data to second image data to be used to reproduce, under a second observation condition, the appearance of the color of the subject as perceived under the first observation condition; and a storage unit that stores a plurality of color conversion matrices to be used in the color conversion, corresponding to a plurality of observation conditions, the plurality of color conversion matrices being obtained in advance. And the color conversion unit selects a color conversion matrix corresponding to a specified observation condition from the plurality of color conversion matrices stored in the storage unit and executes color conversion to convert the first image data to the second image data by using the selected color conversion matrix.

According to the 28th aspect of the present invention, an image processing device that reproduces under a second observation condition an appearance of a color of an image as perceived under a first observation condition, comprises: an image data acquisition unit that obtains first image data to be used to provide an image under the first observation condition; a color conversion unit that executes color conversion to convert the first image data to second image data to be used to reproduce, under the second observation condition, the appearance of the color of the image as perceived under the first observation condition; and a storage unit that stores a plurality of color conversion matrices to be used in the color conversion, corresponding to a plurality of observation conditions, the plurality of color conversion matrices being obtained in advance. And the color conversion unit selects a color conversion matrix corresponding to a specified observation condition from the plurality of color conversion matrices stored in the storage unit and executes color conversion to convert the first image data to the second image data by using the selected color conversion matrix.

According to the 29th aspect of the present invention, in the image processing device according to the 27th aspect, it is preferred that: the image processing device further comprises an observation method specifying unit that specifies one of a plurality of observation methods related to a time interval elapsing between observation conducted under the first observation condition and observation conducted under the second observation condition, and an ambient light specifying unit that specifies one of a plurality of ambient light conditions that may be adopted under the second observation condition; the storage unit stores therein the plurality of color conversion matrices each corresponding to a specific combination of one of the plurality of observation methods and one of the plurality of ambient light conditions; the plurality of color conversion matrices each include a matrix component assuming a value related to an adapted white point in case that visual perception is adapted under an observation condition that is at least one observation condition of the first observation condition and the second observation condition, calculated by taking into consideration information related to an illuminating light source used under another observation condition in addition to information related to an illuminating light source used under the one observation condition; and the color conversion unit selects a color conversion matrix among the plurality of color conversion matrices stored in the storage unit in correspondence to the combination of the observation method specified via the observation method specifying unit and the ambient light condition specified via the ambient light specifying unit and executes color conversion to convert the first image data to the second image data by using the selected color conversion matrix.

According to the 30th aspect of the present invention, in the image processing device according to the 1st aspect, it is preferred that the first image data obtained by the image data acquisition unit are image data generated by capturing a microscope image.

According to the 31st aspect of the present invention, an image processing method for reproducing under a second observation condition an appearance of a color of a subject as perceived under a first observation condition, comprises: obtaining first image data generated by capturing a subject image under the first observation condition; obtaining information related to a first illuminating light source used under the first observation condition; obtaining information related to a second illuminating light source used under the second observation condition; calculating an adapted white point in case that visual perception is adapted under an observation condition that is at least one observation condition of the first observation condition and the second observation condition by taking into consideration information related to the illuminating light source used under another observation condition in addition to information related to the illuminating light source used under the one observation condition; and executing color conversion to convert the first image data to second image data used to reproduce under the second observation condition the appearance of the color of the subject as perceived under the first observation condition based upon the adapted white point having been calculated.

According to the 32nd aspect of the present invention, an image processing method for reproducing under a second observation condition an appearance of a color of an image as perceived under a first observation condition, comprises: obtaining first image data to be used to provide the image under the first observation condition; obtaining information related to a first illuminating light source used under the first observation condition; obtaining information related to a second illuminating light source used under the second observation condition; calculating an adapted white point in case that visual perception is adapted under an observation condition that is at least one observation condition of the first observation condition and the second observation condition by taking into consideration information related to the illuminating light source used under another observation condition in addition to information related to the illuminating light source used under the one observation condition; and executing color conversion to convert the first image data to second image data used to reproduce under the second observation condition the appearance of the color of the image as perceived under the first observation condition based upon the adapted white point having been calculated.

According to the 33rd aspect of the present invention, in the image processing method according to the 31st aspect, it is preferred that: the characteristic quantity is an adapted white point; and an adapted white point in case that visual perception is adapted under an observation condition that is at least one observation condition of the first observation condition and the second observation condition is calculated by taking into consideration the information related to the illuminating light source used under the other observation condition in addition to the information related to the illuminating light source used under the one observation condition.

According to the 34th aspect of the present invention, an image processing method for reproducing under a second observation condition an appearance of a color of a subject as perceived under a first observation condition, comprises: obtaining first image data generated by capturing a subject image under the first observation condition; executing color conversion to convert the first image data to second image data to be used to reproduce, under the second observation condition, the appearance of the color of the subject as perceived under the first observation condition; and obtaining in advance a plurality of color conversion matrices to be used for the color conversion corresponding to a plurality of observation conditions, and storing the plurality of color conversion matrices into a storage unit. And the color conversion is executed to convert the first image data to the second image data by using a color conversion matrix corresponding to a specified observation condition, selected from the plurality of color conversion matrices stored in the storage unit.

According to the 35th aspect of the present invention, an image processing method for reproducing under a second observation condition an appearance of a color of an image as perceived under a first observation condition, comprises: obtaining first image data to be used to provide the image under the first observation condition; executing color conversion to convert the first image data to second image data to be used to reproduce, under the second observation condition, the appearance of the color of the image as perceived under the first observation condition; and obtaining in advance a plurality of color conversion matrices to be used for the color conversion corresponding to a plurality of observation conditions, and storing the plurality of color conversion matrices into a storage unit. And the color conversion is executed to convert the first image data to the second image data by using a color conversion matrix corresponding to a specified observation condition, selected from the plurality of color conversion matrices stored in the storage unit.

According to the 36 aspect of the present invention, in the image processing method according to the 33rd aspect, it is preferred that: the adapted white point is calculated by also taking into consideration an adaptation factor indicating an extent of adaptation to an illumination condition adopted under the first observation condition; and the adaptation factor taken into consideration is adjusted in correspondence to a color of a conversion target pixel.

According to the 37th aspect of the present invention, in the image processing method according to the 33rd aspect, it is preferred that: the adapted white point is calculated by also taking into consideration an adaptation factor indicating an extent of adaptation to an illumination condition adopted under the second observation condition; and the adaptation factor taken into consideration is adjusted in correspondence to a color of a conversion target pixel.

According to the 38th aspect of the present invention, in the image processing method according to the 33rd aspect, it is preferred that: the adapted white point is calculated by also taking into consideration an adaptation factor indicating an extent of adaptation to an illumination condition adopted under the first observation condition and an adaptation factor indicating an extent of adaptation to an illumination condition adopted under the second observation condition; and the adaptation factors taken into consideration are adjusted in correspondence to a color of a conversion target pixel.

According to the 39th aspect of the present invention, in the image processing method according to the 33rd aspect, it is preferred that: the adapted white point is calculated by also taking into consideration an adaptation factor indicating an extent of adaptation to an illumination condition adopted under the first observation condition; a color distribution in the first image data is analyzed; and the adaptation factor taken into consideration is adjusted based upon the color distribution resulting from analysis.

According to the 40th aspect of the present invention, in the image processing method according to the 33rd aspect, it is preferred that: the adapted white point is calculated by also taking into consideration an adaptation factor indicating an extent of adaptation to an illumination condition adopted under the second observation condition; a color distribution in the first image data is analyzed; and the adaptation factor taken into consideration is adjusted based upon the color distribution resulting from analysis.

According to the 41st aspect of the present invention, in the image processing method according to the 33rd aspect, it is preferred that: the adapted white point is calculated by also taking into consideration an adaptation factor indicating an extent of adaptation to an illumination condition adopted under the first observation condition and also an adaptation factor indicating an extent of adaptation to an illumination condition adopted under the second observation condition; a color distribution in the first image data is analyzed; and the adaptation factor taken into consideration is adjusted based upon the color distribution resulting from analysis.

According to the 42nd aspect of the present invention, a computer-readable computer program product contains an image processing program that enables a computer to execute an image processing method according to the 29th aspect.

According to the 43rd aspect of the present invention, an image processing device that reproduces under a second observation condition an appearance of a color of an observation target as perceived under a first observation condition, comprises: an image data acquisition unit that obtains first image data related to the observation target observed under the first observation condition; a first illumination condition acquisition unit that obtains information related to a first illuminating light source used under the first observation condition; a second illumination condition acquisition unit that obtains information related to a second illuminating light source used under the second observation condition; a characteristic quantity calculation unit that calculates a characteristic quantity related to a state of visual perception adaptation under an observation condition that is at least one observation condition of the first observation condition and the second observation condition by taking into consideration information related to the illuminating light source used under another observation condition in addition to information related to the illuminating light source used under the one observation condition; and a color conversion unit that executes color conversion to convert the first image data to second image data to be used to reproduce, under the second observation condition, the appearance of the color of the observation target as perceived under the first observation condition, based upon the characteristic quantity having been calculated.

According to the 44th aspect of the present invention, an image processing device according to the 43rd aspect, it is preferred that: the characteristic quantity is an adapted white point; and the characteristic quantity calculation unit is an adapted white point calculation unit that calculates a white point in case that visual perception is adapted under an observation condition that is at least one observation condition of the first observation condition and the second observation condition by taking into consideration the information related to the illuminating light source used under the other observation condition in addition to the information related to the illuminating light source used under the particular observation condition.

BRIEF DESCRIPTION OF THE DRAWINGS

FIG. 8 shows a table of matrices 1~4 corresponding to four modes.

DESCRIPTION OF PREFERRED EMBODIMENTS

First Embodiment

The digital camera achieved in an embodiment of the image processing device according to the present invention is now described. In the digital camera achieved in the embodiment, when a photographic image that has been obtained by photographing a microscope image (the term is used to refer to an image enlarged via a microscope) is displayed on a monitor, the photographic image achieves a color appearance similar to the color of the microscope observation image observed with the naked eye. More specifically, optimal color conversion processing such as that described below is executed within a digital camera on an image photographed with the digital camera.

-Microscope Observation System-

Figure 1:
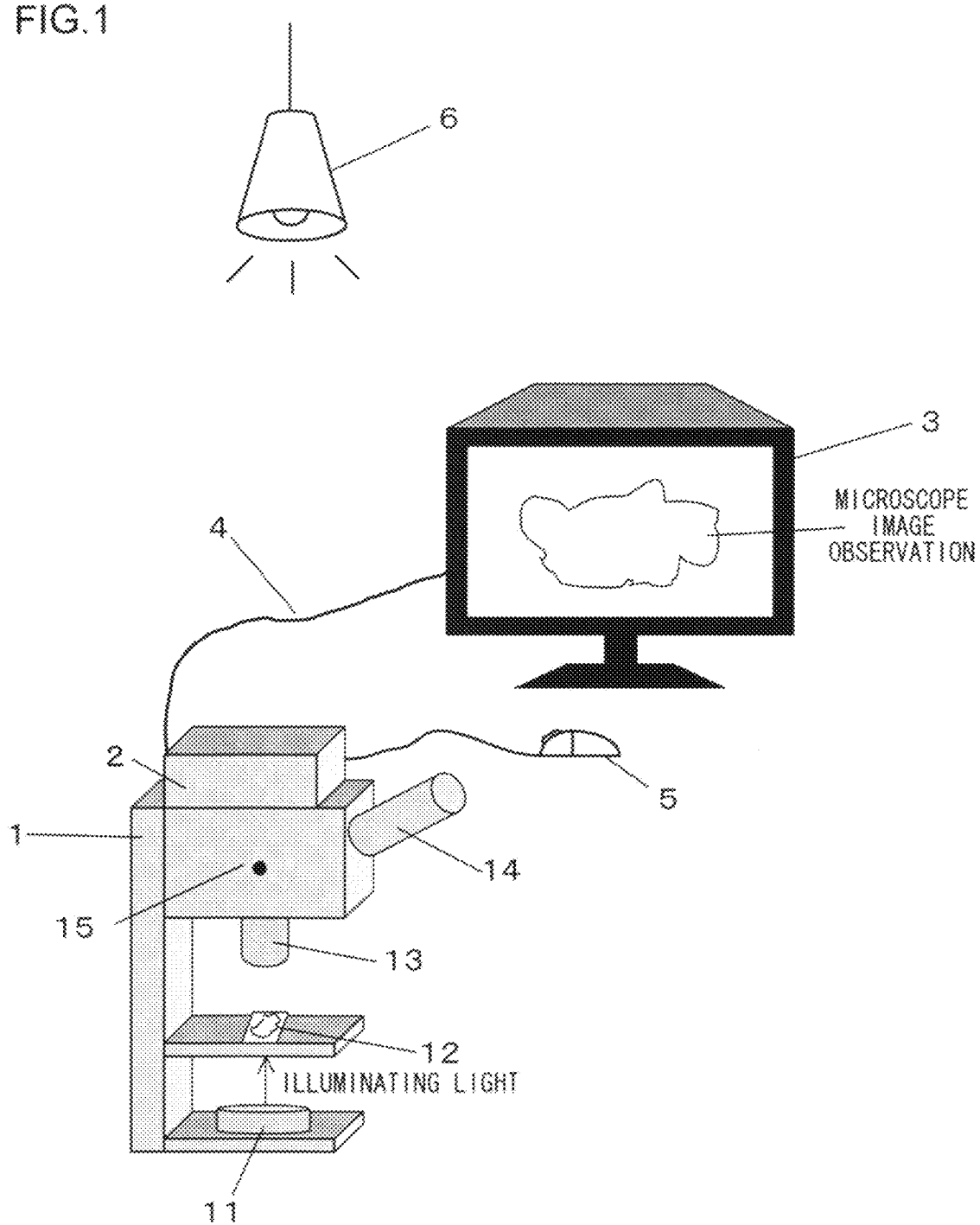
FIG. 1 shows a microscope observation system comprising a microscope 1, a microscope digital camera 2 and a monitor 3.

FIG. 1 shows a microscope observation system configured with a microscope 1, a microscope digital camera (hereafter may be simply referred to as a digital camera) 2 and a monitor 3. An illuminating light source 6, which illuminates the room where the microscope observation system is placed, provides ambient light for the microscope 1 and the monitor 3, as detailed later. The digital camera 2 and the monitor 3 are connected via a cable 4. A mouse 5 is connected to the digital camera 2, and thus, various settings can be selected via the mouse 5 in various menus brought up on display at the monitor 3.

A specimen (sample) 12 is illuminated with an illuminating light source 11 and a specimen image magnified through an objective lens 13 and an eyepiece lens 14 can be observed through the microscope 1. As shown in FIG. 1, the digital camera 2 is mounted atop the microscope 1. Via the digital camera 2, the photographic image can be displayed in real-time at the monitor 3 connected to the digital camera 2.

The microscope 1 includes a visual field selector switch 15 via which the visual field can be switched to the eyepiece lens 14 or to the digital camera 2. Thus, the specimen 12 can be directly observed with the naked eye through the eyepiece lens 14 or the specimen 12 can be observed as a photomicrograph captured with the digital camera 2, which is brought up on display at the monitor 3. While the light can be switched completely to the eyepiece lens side or the digital camera side via the visual field selector switch 15, the light can be also split into halves via the visual field selector switch as well. Thus, the specimen can be observed simultaneously through the eyepiece lens 14 and on the monitor 3.

A specific type of color conversion processing is executed in the digital camera 2 in the embodiment, so as to ensure that the microscope image observed directly through the eyepiece lens 14 at the microscope 1 and the photomicrograph captured with the digital camera 2 and displayed at the monitor 3 have similar color appearances.

The microscope image observed at the microscope 1 and the display image at the monitor 3 may appear different mainly due to the difference between the color temperature of the light source 11 and the color temperature of the monitor 3, the difference between the levels of illumination brightness of the light source 11 and the monitor 3, the difference between the ambient light condition under which the microscope image is observed through the eyepiece lens 14 and the ambient light condition under which the image on display at the monitor 3 is observed. While the color temperature of the monitor 3 in a standard viewing condition is fixed at D65, the color temperature of the microscope illumination is determined by the characteristics of the lamp constituting the light source 11 and is often lower than that of the monitor 3, at approximately 3000K~5000K. This means that the image displayed at the monitor 3 is bound to take on a color different from that of the microscope observation image directly viewed with the naked eye through the eyepiece lens 14 unless the difference between the color temperature at the illuminating light source 11 and the color temperature at the monitor 3 is factored in.

In addition, the luminance of the monitor 3 in the standard viewing condition is fixed at 80 Cd/m² and the luminance at an LCD typically used in this type of application can only be set to approximately 200 Cd/m² at the most. In reality, the luminance of the monitor at its maximum brightness setting will decrease due to deterioration occurring over years and, for this reason, the monitor is more likely to be used with the luminance level at or below 200 Cd/m². When the specimen is observed through the eyepiece lens 14 at the microscope 1, the luminance is often equal to or higher than 300 Cd/m² and under certain circumstances, the specimen may be observed at a luminance level equal to or higher than 1000 Cd/m², almost 10 times the luminance level at which the image displayed on the monitor is observed.

The ambient light condition is another factor that will affect the appearance of the specimen image. When the specimen is observed through the eyepiece lens 14 at the microscope, the user will have his eye placed near the eyepiece lens to look at the microscope image, and will be not much affected by the surrounding conditions (i.e., it will not matter whether the surrounding environment is light or dark). The image displayed on the monitor 3 is normally observed in a brightly-lit room and, for this reason, the monitor display image will appear to have less contrast compared to the specimen image directly observed through the eyepiece lens 14. Furthermore, if the color temperature of the monitor 3 and the color temperature of the ambient light are different, the ambient light color temperature also needs to be considered since the visual perception is also affected by the color temperature of the ambient light.

In the embodiment, the following image processing is executed within the digital camera 2 so as to ensure that the microscope observation image of the specimen 12 directly observed through the eyepiece lens 14 and the microscope observation image of the specimen 12 indirectly observed via the monitor 3 have similar color appearances by factoring in the varying viewing conditions discussed above.

Figure 2:
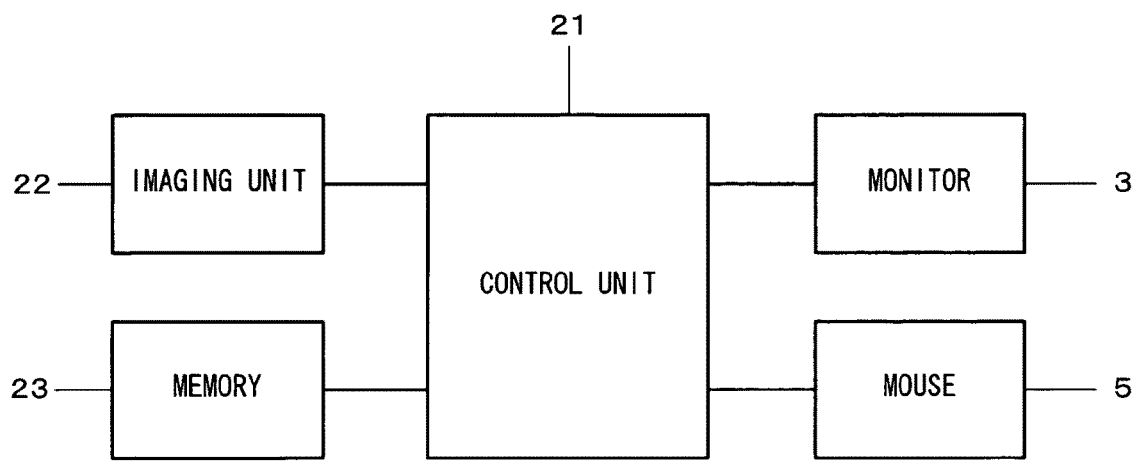
FIG. 2 shows a block diagram of the digital camera 2 that includes a control unit 21, imaging unit 22 and a memory 23.

FIG. 2 shows a control unit 21, an imaging unit 22, a memory 23 and the like in the digital camera 2. The control unit 21, constituted with a microprocessor, peripheral circuits and the like, executes various types of control for the digital camera 2 and the image processing to be detailed later by executing a program stored in the memory 23. In the memory 23, which also functions as a temporary buffer during image processing, various types of information, as well as the program, are stored. Accordingly part of the memory 23 is constituted with non-volatile memory.

The imaging unit 22, constituted with an image sensor such as a CCD, converts a light flux originating from the subject and received therein via a photographic optical system (not shown) such as a photographic lens, to electrical signals, digitizes the electrical signals resulting from the conversion and outputs digital image data. The imaging unit 22, equipped with RGB color filters, outputs image data expressed in the RGB calorimetric system.

Figure 3:
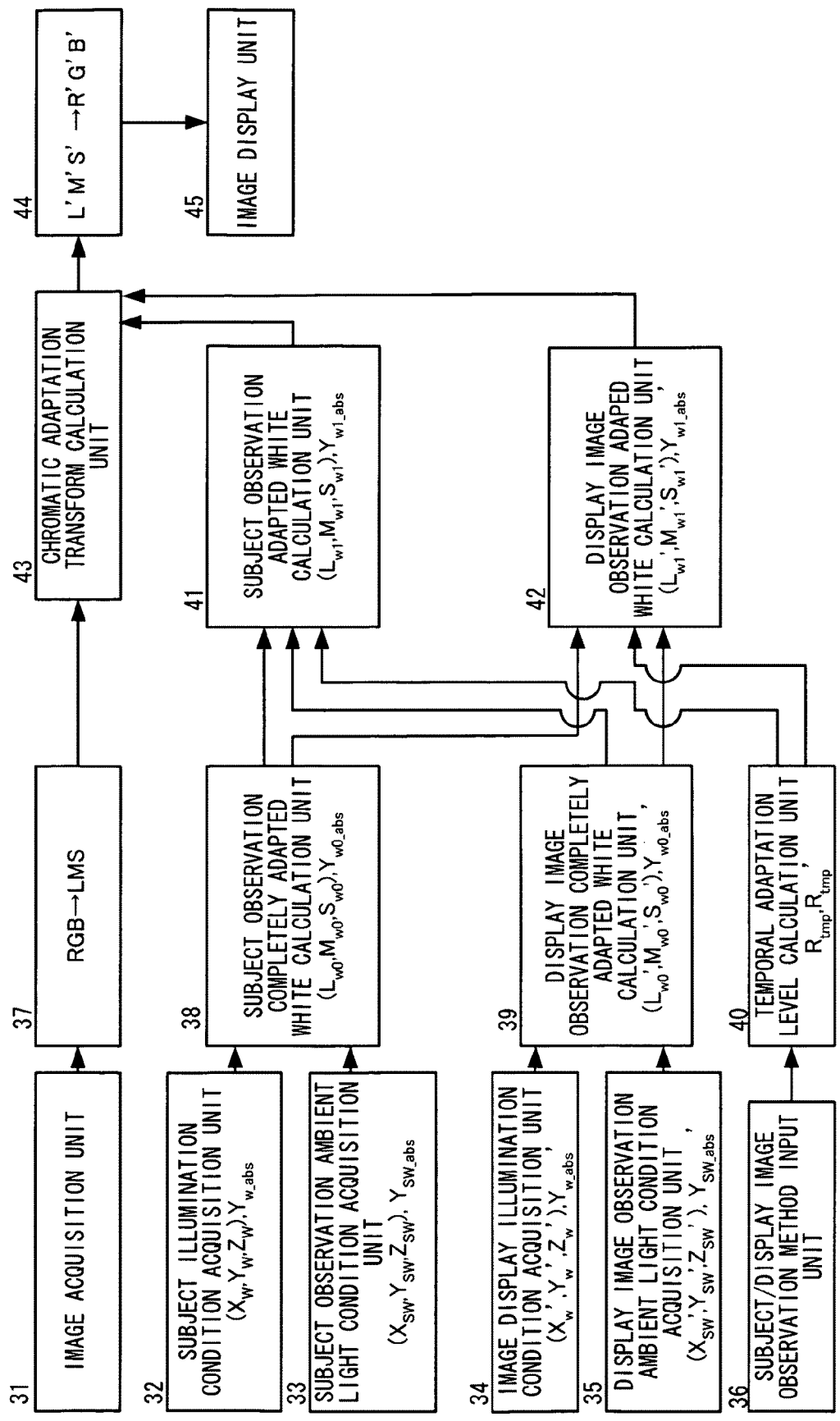
FIG. 3 shows a block diagram illustrating the processing executed by the control unit 21 in the digital camera 1 in a first embodiment.

FIG. 3 is a block diagram of the processing executed by the control unit 21 in the digital camera 2. An image acquisition unit 31 obtains image data expressed in the RGB calorimetric system from the imaging unit 22.

A subject illumination condition acquisition unit 32 obtains a white point $(X_W, Y_W, Z_W)$ of the light source 11 that illuminates the specimen 12, i.e., the subject observed through the microscope 1 and an absolute luminance $Y_{W\_abs}$ of the illuminating light source 11. More specifically, the subject illumination condition acquisition unit 32 brings up on display a menu screen in which the type of the light source 11 can be specified at the monitor 3 and the observer (user) specifies the type of the light source 11 with the mouse 5. For instance, a list of different types of light sources such as a mercury lamp and an LED may be displayed in the menu screen so as to allow the observer to specify the type of illuminating light source 11 used in conjunction with the microscope 1 via the mouse 5. Once the type of light source is determined, the color temperature of the particular light source can be ascertained and thus, the white point $(X_W, Y_W, Z_W)$ of the light source can be ascertained. The absolute luminance $Y_{W\_abs}$ can be ascertained based upon the output from a photometering device (not shown) in the digital camera 2.

A subject observation ambient light condition acquisition unit 33 obtains a white point $(X_{SW}, Y_{SW}, Z_{SW})$ of the ambient light under which the subject is observed through the microscope and an absolute luminance $(Y_{SW\_abs})$ of the light. The subject observation ambient light condition acquisition unit 33 brings up on display a menu screen in which the type and the brightness of ambient light 6 can be specified at the monitor 3 and the observer specifies the type and the level of the ambient light 6 via the mouse 5. For instance, a list of different types of light sources such as an incandescent lamp and a fluorescent lamp and a list of varying levels of light (bright, normal, dark, etc.) may be displayed in the menu screen so as to allow the observer to specify the type and the level of the ambient light via the mouse 5. Once the type of the illumination 6 is determined, the color temperature of the particular light source can be ascertained and thus, the white point $(X_{SW}, Y_{SW}, Z_{SW})$ of the light source can be ascertained. In addition, the absolute luminance $Y_{SW\_abs}$ of the illumination can be estimated based upon the specified light level such as "bright", "normal" or "dark". Namely, the type and the level of light specified by the observer in the menu screen displaying a plurality of predicted ambient light conditions, are selected.

An image display illumination condition acquisition unit 34 obtains a white point $(X_W', Y_W', Z_W')$ of the monitor 3 at which an image resulting from a chromatic adaptation transform is brought up on display and an absolute luminance $Y_{W\_abs}'$ of the monitor 3. The white point $(X_W', Y_W', Z_W')$ of the monitor 3 and the absolute luminance $Y_{W\_abs}'$ of the monitor 3 are preset as part of a standard viewing condition and are stored in the memory within the control unit 21. They can thus be ascertained by checking the stored data. The standard viewing condition in the embodiment is the sRGB standard viewing condition (with the monitor 3 assuming a color temperature of D65 and a luminance level of 80 Cd/m²).

A display image observation ambient light condition acquisition unit 35 obtains a white point $(X_{SW}', Y_{SW}', Z_{SW}')$ of the ambient light in the environment in which the image on display at the monitor 3 is observed and an absolute luminance $Y_{SW\_abs}'$ of the illumination. The display image observation ambient light condition acquisition unit 35 brings up on display a menu screen in which the type and the brightness of ambient light 6 can be specified at the monitor 3 and the observer specifies the type and the level of the ambient light 6 by the mouse 5. For instance, it may bring up on display a list of different types of light sources such as an incandescent lamp and a fluorescent lamp and a list of varying levels of light (bright, normal, dark, etc.) in the menu screen as may the subject observation ambient light condition acquisition unit 33, so as to allow the observer to specify the type and the level of the ambient light via the mouse 5. Once the type of the illumination is determined, the color temperature of the particular light source can be ascertained and thus, the white point $(X_{SW}', Y_{SW}', Z_{SW}')$ of the light source can be ascertained. In addition, the absolute luminance $Y_{SW\_abs}'$ of the illumination can be estimated based upon the specified light level such as "bright", "normal" or "dark". Namely, the type and the light level specified by the observer in the menu screen displaying a plurality of predicted ambient light conditions are selected. It is to be noted that since the display image and the subject are observed in the same room, the same indoor illumination 6 is used for the display image observation and the subject observation in the embodiment.

A subject/display image observation method input unit 36 enables the observer to indicate in a menu screen that the display image on the monitor 3 is an image to be observed while the subject is also directly observed through the microscope eyepiece lens, an image to be saved or an image to be observed simply as a monitor display image at a remote location away from the microscope 1.

The image to be observed while the subject is also directly observed is an image displayed at the monitor 3 for purposes of combination observation, whereby microscope observation and monitor observation are alternately conducted. After the image to be saved is brought up on display at the monitor 3, it is saved into a recording medium or the like so that it can be observed on the monitor 3 later by itself without conducting microscope observation. In other words, the image to be saved and the image to be observed simply as a monitor display image at a remote location away from the microscope 1 are images to be observed in a state unaffected by the microscope observation condition.

A temporal adaptation level calculation unit 40 determines a temporal adaptation level $R_{tmp}$ for the direct observation of the subject through the eyepiece lens 14 of the microscope 1 and a temporal adaptation level $R_{tmp}'$ for the observation of the image at the monitor 3 within a value range of 0.0~1.0, based upon a selection having been made via the subject/display image observation method input unit 36. The term "temporal adaptation level" is used to refer to a parameter indicating the level of adaptation of the visual perception to a viewing condition 2 when a given viewing condition 1 shifts to the viewing condition 2.

Figure 4:
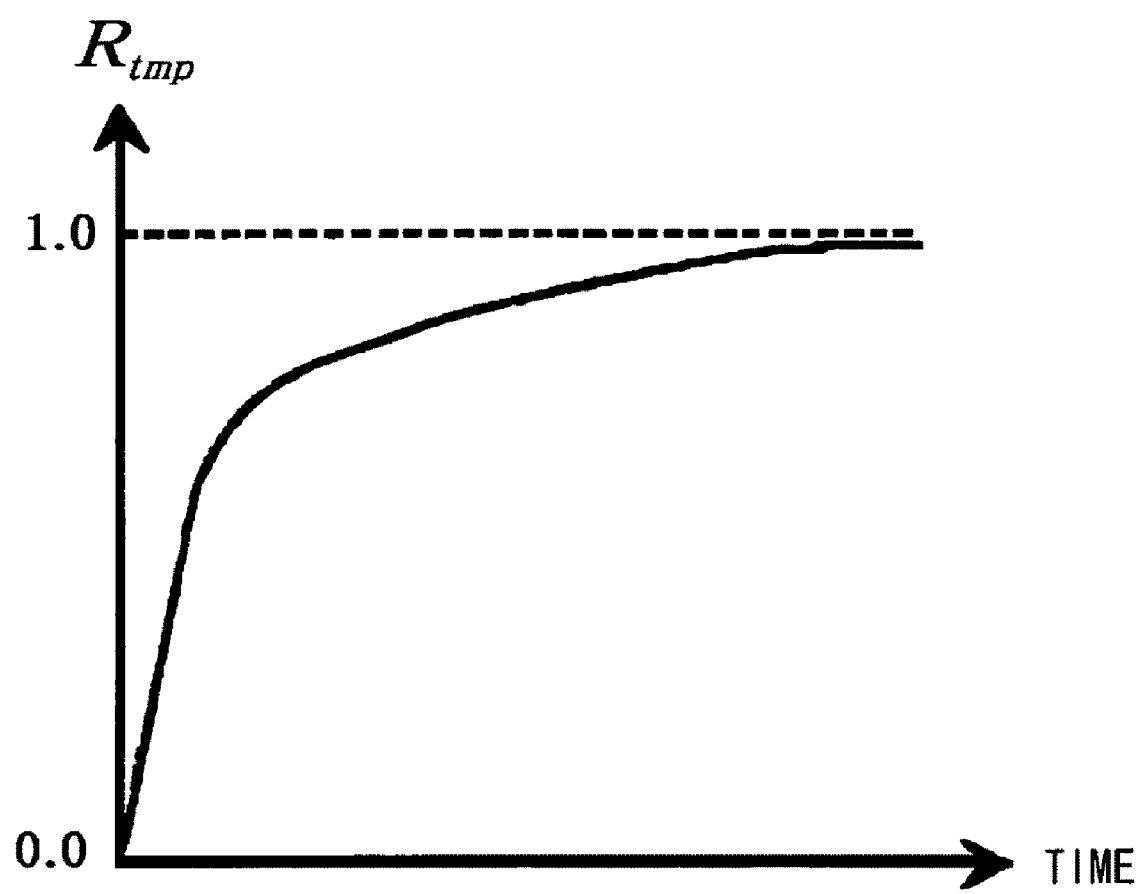
FIG. 4 shows a change in the temporal adaptation level $R_{tmp}$ occurring over time.

FIG. 4 shows the change in the temporal adaptation level $R_{tmp}$ occurring over time. Once the viewing condition shifts to the viewing condition 2, the temporal adaptation level $R_{tmp}$, initially close to 0.0, takes on values increasingly closer to 1.0 over time, as indicated by the nonlinear function curve in FIG. 4. The temporal adaptation level, which experiences an acute increase over a short period of time initially, subsequently increases more and more gently until it reaches 1.0. Assuming $R_{tmp}$ represents the ratio of the adaptation of the visual perception to the viewing condition 2, the remainder $(1-R_{tmp})$ represents the residual state of adaptation to the viewing condition 1. In conjunction with the embodiment, the viewing condition 1 may be regarded as the viewing condition in which the image on display at the monitor 3 is observed and the viewing condition 2 may be regarded as the viewing condition in which the specimen 12 is directly observed at the microscope 1. The temporal adaptation level $R_{tmp}'$, indicating the extent of adaptation that occurs as the viewing condition shifts from the viewing condition 2 to the viewing condition 1, can also be determined in a similar manner.

For instance, when the display image is an image to be saved or an image to be observed simply as a display image at the monitor 3 at a remote location away from the microscope 1, the visual perception is completely adapted to the viewing condition for monitor observation. In other words, since the visual perception is not affected by the viewing condition for microscope observation, both $R_{tmp}$, and $R_{tmp}'$ should be set to 1.0 ($R_{tmp}=R_{tmp}'=1.0$).

However, when the image on display at the monitor 3 is observed while the specimen is also directly observed through the eyepiece lens 14 of the microscope 1, the visual perception is not fully adapted to the viewing condition for monitor observation and, instead, is also affected by the viewing condition for microscope observation. For this reason, $R_{tmp}$ and $R_{tmp}'$ should both be set to 0.8 ($R_{tmp}=R_{tmp}'=0.8$). The value 0.8 has been determined through testing and the like. It is to be noted that temporal adaptation levels $R_{tmp}$ and $R_{tmp}'$ taking on values corresponding to changes in the traveling time and the traveling distance over which the observer's eye must move between the observation targets in the different viewing conditions should be determined through testing, simulation or the like.

An RGB/LMS conversion unit 37 converts the pixel RGB values from the individual pixels constituting the image data in the RGB color space inherent to the camera, having been output from the image acquisition unit 31, to colorimetric XYZ values, as expressed in (1) below and then further converts the XYZ data to data in the LMS space, which is a color space similar to the human cone response, as expressed in (2) below. It is to be noted that the matrix A in expression (1) is a 3×3 matrix stored in advance in correspondence to the spectral characteristics of the camera. The matrix $M_{CAT02}$ in expression (2) is a conversion matrix used to convert the XYZ data to the cone response LMS data. In the embodiment, CAT02 as defined by the CIE as expressed in (3) is used as $M_{CAT02}$.

[Expression 1]

$$\begin{bmatrix} X \\ Y \\ Z \end{bmatrix} = A \cdot \begin{bmatrix} R \\ G \\ B \end{bmatrix} \quad (1)$$

[Expression 2]

$$\begin{bmatrix} L \\ M \\ S \end{bmatrix} = M_{CAT02} \cdot \begin{bmatrix} X \\ Y \\ Z \end{bmatrix} \quad (2)$$

[Expression 3]

$$M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (3)$$

A subject observation completely adapted white calculation unit 38 calculates an adapted white point $(X_{W0}, Y_{W0}, Z_{W0})$ assumed when the visual perception is completely adapted to the subject observation environment, based upon the calorimetric value $(X_W, Y_W, Z_W)$ of the subject illuminating light source having been obtained via the subject illumination condition acquisition unit 32 and the colorimetric value $(X_{SW}, Y_{SW}, Z_{SW})$ of the subject illuminating light source having been obtained via the subject observation ambient light condition acquisition unit 33. It is desirable that white in different viewing conditions may be blended in the LMS space, which is a color space approximating the human cone response.

Accordingly, $(X_W, Y_W, Z_W)$ and $(X_{SW}, Y_{SW}, Z_{SW})$ are converted to response in the LMS space, as expressed in (4) and (5) below.

[Expression 4]

$$\begin{bmatrix} L_w \\ M_w \\ S_w \end{bmatrix} = M_{CAT02} \begin{bmatrix} X_w \\ Y_w \\ Z_w \end{bmatrix} \quad (4)$$

-continued

[Expression 5]

$$\begin{bmatrix} L_{sw} \\ M_{sw} \\ S_{sw} \end{bmatrix} = M_{CAT02} \begin{bmatrix} X_{sw} \\ Y_{sw} \\ Z_{sw} \end{bmatrix} \quad (5)$$

Next, based upon a ratio $R_{mix}$ of the influences of the subject illuminating light source and the ambient illuminating light source used while observing the subject and the absolute luminance levels of $Y_{W\_abs}$ and $Y_{SW\_abs}$ of the respective illuminating light sources, LMS response $(L_{W0}, M_{W0}, S_{W0})$ of the adapted white point and the adapted luminance $Y_{W0\_abs}$ assumed when the visual perception is completely adapted to the subject viewing condition are determined as expressed in (6). A value of approximately 0.9 is stored in advance to be used as $R_{mix}$. Through expression (6), the adapted white point under mixed illumination is determined in a manner similar to that described in the following literature. Literature "CIE 162:2004 Chromatic Adaptation Under Mixed Illumination Condition When Comparing Softcopy and Hardcopy Images", CIE, 2004

[Expression 6]

$$L_{w0} = \frac{R_{mix} \cdot Y_{w\_abs}^{1/3} \cdot L_w + (1 - R_{mix}) \cdot Y_{sw\_abs}^{1/3} \cdot L_{sw}}{R_{mix} \cdot Y_{w\_abs}^{1/3} + (1 - R_{mix}) \cdot Y_{sw\_abs}^{1/3}}$$

$$M_{w0} = \frac{R_{mix} \cdot Y_{w\_abs}^{1/3} \cdot M_w + (1 - R_{mix}) \cdot Y_{sw\_abs}^{1/3} \cdot M_{sw}}{R_{mix} \cdot Y_{w\_abs}^{1/3} + (1 - R_{mix}) \cdot Y_{sw\_abs}^{1/3}}$$

$$S_{w0} = \frac{R_{mix} \cdot Y_{w\_abs}^{1/3} \cdot S_w + (1 - R_{mix}) \cdot Y_{sw\_abs}^{1/3} \cdot S_{sw}}{R_{mix} \cdot Y_{w\_abs}^{1/3} + (1 - R_{mix}) \cdot Y_{sw\_abs}^{1/3}}$$

$$Y_{w0\_abs} = \{R_{mix} \cdot Y_{w\_abs}^{1/3} + (1 - R_{mix}) \cdot Y_{sw\_abs}^{1/3}\}^3$$

(6)

The ratio $R_{mix}$ of the influences of the subject illuminating light source and the ambient illuminating light source takes on a value within a range of 0~1. It assumes a value closer to 1 when the influence of the ambient light is less significant and assumes a smaller value when the influence of the ambient light is more significant. Accordingly, $R_{mix}$ should take on different values in correspondence to varying extents of influences of the subject illuminating light source 11 and the ambient illuminating light source 6 relative to each other. For instance, if microscope observation is conducted without being affected by the ambient illuminating light source 6 at all, the ratio $R_{mix}$, may be set to 1. Under such circumstances, the LMS response $(L_{W0}, M_{W0}, S_{W0})$ of the adapted white point will be equal to $(L_W, M_W, S_W)$. However, a very small amount of illuminating light from the ambient illuminating light source 6 is present in the visual field when the subject is observed through the eyepiece lens 14 in the embodiment. For this reason, a value of approximately 0.9 is used for $R_{mix}$, as described above.

In a manner similar to that adopted in the subject observation completely adapted white calculation unit 38, a display image observation completely adapted white calculation unit 39 calculates LMS response $(L_{W0}', M_{W0}', S_{W0}')$ of the adapted white point and an adapted luminance $Y_{W0\_abs}'$ assumed when the visual perception is completely adapted to the monitor display image viewing condition, based upon the calorimetric value $(X_W', Y_W', Z_W')$ of the image display illuminating light source, the colorimetric value $(X_{SW}', Y_{SW}', Z_{SW}')$ of the ambient illuminating light source used while the display image is observed and the respective absolute illumination light levels $Y_{W\_abs}'$ and $Y_{SW\_abs}'$. However, the display image observation differs from the subject observation in that the influence of the ambient light 6 is significant and, for this reason, a value in a range of 0.5~0.6 should be used for $R_{mix}$. Such a value assumed for $R_{mix}$ indicates that the ratio of the influence of the illumination at the monitor 3 itself is somewhat greater than 0.5.

Next, a subject observation adapted white calculation unit 41 calculates cone response $(L_{W1}, M_{W1}, S_{W1})$ of the white point in case that the visual perception of the observer viewing the specimen 12, i.e., the subject, through the microscope 1, is actually adapted and the corresponding adapted luminance $Y_{W1\_abs}$ as expressed below, based upon the adapted white point $(L_{W0}, M_{W0}, S_{W0})$ having been calculated by the subject observation completely adapted white calculation unit 38, the adapted white point $(L_{W0}', M_{W0}', S_{W0}')$ having been calculated by the display image observation completely adapted white calculation unit 39 and the temporal adaptation level $R_{tmp}$ having been calculated by the temporal adaptation level calculation unit 40. Namely, the adapted white point $(L_{W1}, M_{W1}, S_{W1})$ under the observation condition in which the subject observation is conducted through the microscope 1 is calculated by factoring in the illumination condition corresponding to the observation condition under which the display image is observed at the monitor 3 based upon the temporal adaptation level $R_{tmp}$.

[Expression 7]

$$L_{w1} = \frac{R_{tmp} \cdot Y_{w0\_abs}^{1/3} \cdot L_{w0} + (1 - R_{tmp}) \cdot Y_{w0\_abs'}^{1/3} \cdot L_{w0'}}{R_{tmp} \cdot Y_{w0\_abs}^{1/3} + (1 - R_{tmp}) \cdot Y_{w0\_abs'}^{1/3}}$$

$$M_{w1} = \frac{R_{tmp} \cdot Y_{w0\_abs}^{1/3} \cdot M_{w0} + (1 - R_{tmp}) \cdot Y_{w0\_abs'}^{1/3} \cdot M_{w0'}}{R_{tmp} \cdot Y_{w0\_abs}^{1/3} + (1 - R_{tmp}) \cdot Y_{w0\_abs'}^{1/3}}$$

$$S_{w1} = \frac{R_{tmp} \cdot Y_{w0\_abs}^{1/3} \cdot S_{w0} + (1 - R_{tmp}) \cdot Y_{w0\_abs'}^{1/3} \cdot S_{w0'}}{R_{tmp} \cdot Y_{w0\_abs}^{1/3} + (1 - R_{tmp}) \cdot Y_{w0\_abs'}^{1/3}}$$

$$Y_{w1\_abs} = \{R_{tmp} \cdot Y_{w0\_abs}^{1/3} + (1 - R_{tmp}) \cdot Y_{w0\_abs'}^{1/3}\}^3$$

(7)

In a manner similar to that adopted in the subject observation adapted white calculation unit 41, a display image observation adapted white calculation unit 42 calculates cone response $(L_{W1}', M_{W1}', S_{W1}')$ of the white point in case that the visual perception of the observer viewing the image displayed on the monitor 3, is actually adapted and the corresponding adapted luminance $Y_{W1\_abs}'$ as expressed below, based upon the adapted white point $(L_{W0}, M_{W0}, S_{W0})$ having been calculated by the subject observation completely adapted white calculation unit 38, the adapted white point $(L_{W0}', M_{W0}', S_{W0}')$ having been calculated by the display image observation completely adapted white calculation unit 39 and the temporal adaptation level $R_{tmp}'$ having been calculated by the temporal adaptation level calculation unit 40. Namely, the adapted white point $(L_{W1}', M_{W1}', S_{W1}')$ under the observation condition in which the display image is observed at the monitor 3 is calculated by factoring in the illumination condition corresponding to the observation condition under which the subject observation is conducted through the microscope 1 based upon the temporal adaptation level $R_{tmp}'$.

[Expression 8]

$$L_{w1'} = \frac{(1-R_{tmp'}) \cdot Y_{w0'\_abs}{}^{1/3} \cdot L_{w0} + R_{tmp'} \cdot Y_{w0\_abs'}{}^{1/3} \cdot L_{w0'}}{(1-R_{tmp'}) \cdot Y_{w0\_abs}{}^{1/3} + R_{tmp'} \cdot Y_{w0\_abs'}{}^{1/3}}$$ (8)

$$M_{w1'} = \frac{(1-R_{tmp'}) \cdot Y_{w0'\_abs}{}^{1/3} \cdot M_{w0} + R_{tmp'} \cdot Y_{w0\_abs'}{}^{1/3} \cdot M_{w0'}}{(1-R_{tmp'}) \cdot Y_{w0\_abs}{}^{1/3} + R_{tmp'} \cdot Y_{w0\_abs'}{}^{1/3}}$$

$$S_{w1'} = \frac{(1-R_{tmp'}) \cdot Y_{w0'\_abs}{}^{1/3} \cdot S_{w0} + R_{tmp'} \cdot Y_{w0\_abs'}{}^{1/3} \cdot S_{w0'}}{(1-R_{tmp'}) \cdot Y_{w0\_abs}{}^{1/3} + R_{tmp'} \cdot Y_{w0\_abs'}{}^{1/3}}$$

$$Y_{w1\_abs'} = \{(1-R_{tmp'}) \cdot Y_{w0'\_abs}{}^{1/3} + R_{tmp'} \cdot Y_{w0\_abs'}{}^{1/3}\}^3$$

In the embodiment, the chromatic adaptation transform is executed as expressed in von Kries chromatic adaptation expression. A chromatic adaptation transform calculation unit 43 creates $M_{vonKries}$ as expressed in (10) below by using the cone responses ($L_{W1}, M_{W1}, S_{W1}$) and ($L_{W1}', M_{W1}', S_{W1}'$) of the white points in case that the visual perception of the observer is adapted in different environments, having been respectively calculated by the subject observation adapted white calculation unit 41 and the display image observation adapted white calculation unit 42. The cone response (L', M', S') resulting from the chromatic adaptation transform can be calculated as expressed in (9) below by using the cone response (L, M, S) having been calculated by the RGB/LMS conversion unit 37 in correspondence to each of the pixels constituting the photographic image observed under the microscope illumination and $M_{vonKries}$.

[Expression 9]

$$\begin{bmatrix} L' \\ M' \\ S' \end{bmatrix} = M_{vonKries} \cdot \begin{bmatrix} L \\ M \\ S \end{bmatrix}$$ (9)

[Expression 10]

$$M_{vonKries} = \begin{bmatrix} \frac{L'_{W1}}{L_{W1}} & 0 & 0 \\ 0 & \frac{M'_{W1}}{M_{W1}} & 0 \\ 0 & 0 & \frac{S'_{W1}}{S_{W1}} \end{bmatrix}$$ (10)

An L'M'S'/R'G'B' conversion unit 44 converts the data in the cone response LMS space to calorimetric values XYZ and then converts the data to sRGB data for display. The matrix $M_{CAT02}{}^{-1}$ represents a reverse conversion from that executed by using the matrix defined in expression (3), whereas the matrix B is defined in conformance to the sRGB standard. In addition, if the characteristics of the image display monitor do not conform to the sRGB standard, the matrix B must be modified in correspondence to the monitor conditions.

[Expression 11]

$$\begin{bmatrix} X' \\ Y' \\ Z' \end{bmatrix} = M_{CAT02}^{-1} \cdot \begin{bmatrix} L' \\ M' \\ S' \end{bmatrix}$$ (11)

[Expression 12]

$$\begin{bmatrix} R' \\ G' \\ B' \end{bmatrix} = B \cdot \begin{bmatrix} X' \\ Y' \\ Z' \end{bmatrix}$$ (12)

[Expression 13]

$$B = \begin{pmatrix} 3.2406 & -1.5372 & -0.4986 \\ -0.9689 & 1.8758 & 0.0415 \\ 0.0557 & -0.2040 & 1.0570 \end{pmatrix}$$ (13)

The conversions are executed as expressed in (9)~(13) above for each of the pixels constituting the photographic image under the microscope illumination so as to create an image for monitor display. The image thus created is brought up on display at the monitor 3 by an image display unit 45.

It is to be noted that a single matrix C integrating the processing steps executed by the RGB/LMS conversion unit 37, the chromatic adaptation transform calculation unit 43 and the L'M'S'/R'G'B' conversion unit 44 ((the conversions expressed in (1)~(3) and (9)~(13)) may be created and by using this matrix C, the following calculation may be simply executed for each pixel.

[Expression 14]

$$C = B \cdot M_{CAT02}^{-1} \cdot M_{vonKries} \cdot M_{CAT02} \cdot A$$ (14)

[Expression 15]

$$\begin{bmatrix} R' \\ G' \\ B' \end{bmatrix} = C \cdot \begin{bmatrix} R \\ G \\ B \end{bmatrix}$$ (15)

The following advantages are achieved in the embodiment described above.

(1) When the different viewing conditions affect each other to a significant extent, accurate color reproduction cannot be achieved simply by using the white points obtained via the subject illumination condition acquisition unit 32 and the image display illumination condition acquisition unit 34 or the white points obtained via the subject observation completely adapted white calculation unit 38 and the display image observation completely adapted white calculation unit 39 as the white points to be factored in for purposes of a chromatic adaptation transform. However, the adapted white points for the subject observation and the display image observation and the luminance levels in cases that visual perception is adapted to the subject viewing conditions and the display image viewing environments are calculated in the embodiment by taking into consideration how the different viewing conditions affect each other, assuring accurate color reproduction.

(2) When the subject and the display image in different viewing conditions are viewed one after the other, a viewing condition with a high luminance tends to affect the other viewing condition more significantly. In the embodiment, information indicating the light levels in the individual viewing conditions is obtained and the adapted white point corresponding to each viewing condition is calculated by taking into consideration the level of light in the other viewing condition. As a result, accurate color reproduction is achieved through color conversion processing executed by accurately factoring in the influence of the luminance in the other viewing condition on the color appearance.

(3) The adapted white points are each calculated by using a parameter "temporal adaptation level $R_{tmp}$", indicating the influence of the different viewing condition. Thus, the influences of the different viewing conditions can be accurately factored in based upon a simple concept. In addition, even in the event of changes in the different conditions in the two viewing conditions, no complicated measures need to be taken except for modifying the value of the temporal adaptation level $R_{tmp}$.

-Variation 1-

In the first embodiment described above, the subject observation ambient light condition acquisition unit 33 obtains the ambient light condition under which the microscope observation is conducted and the subject observation completely adapted white calculation unit 38 calculates the white point assumed when the visual conception is completely adapted to the microscope viewing condition. However, when capturing a microscope image with a digital camera 2 exclusively used in microscope applications or when a microscope image is observed through the eyepiece lens 14, the influence of the ambient light does not always need to be considered. Namely, if there is no ambient light on the specimen 12 and no ambient light enters the digital camera 2 or the visual field of the observer, there is no need for the subject observation ambient light condition acquisition unit 33 or the subject observation completely adapted white calculation unit 38.

Figure 5:
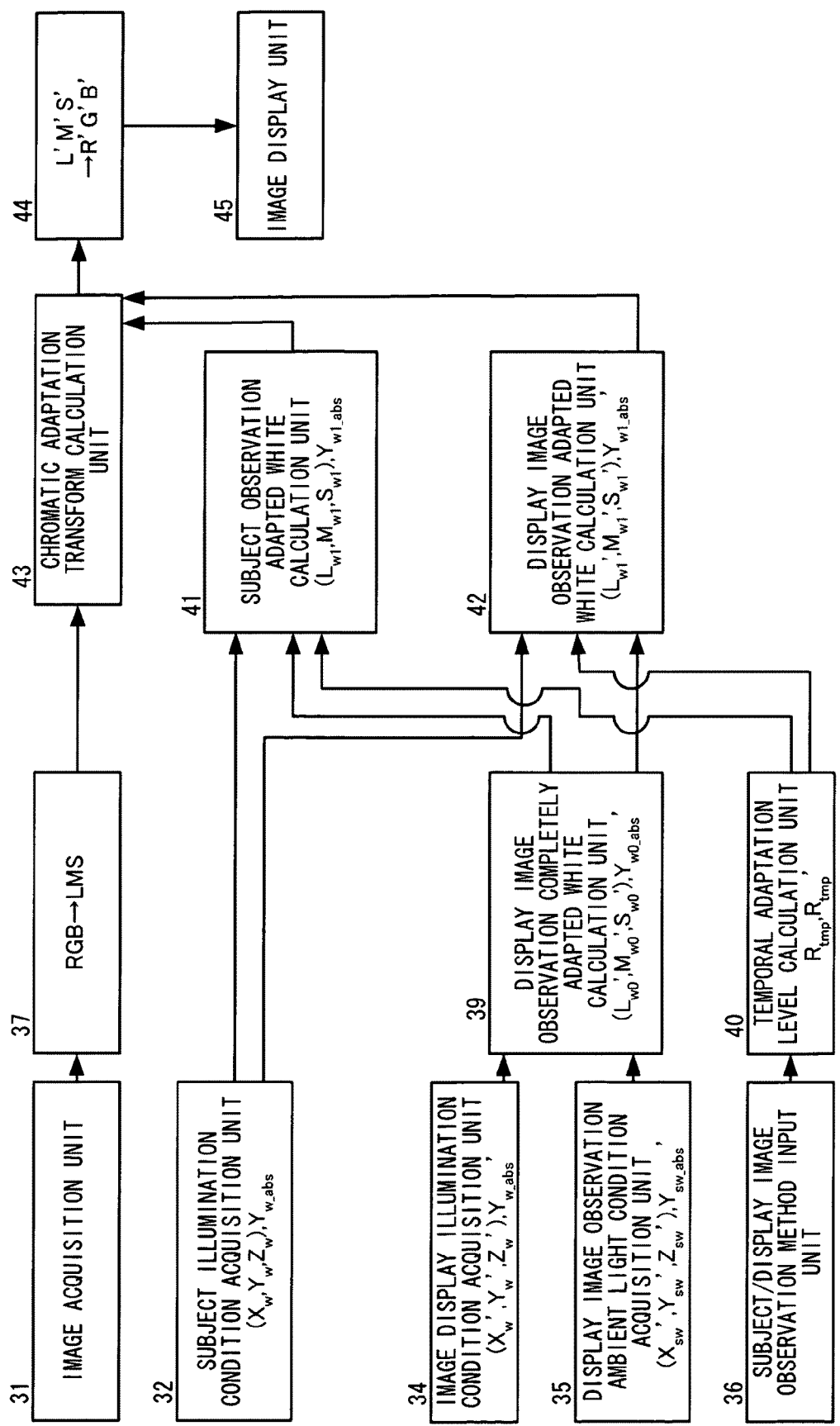
FIG. 5 shows a block diagram illustrating the processing executed by the control unit 21 in the digital camera 1 in variation 1 of the first embodiment.

FIG. 5 is a block diagram of the processing executed by the control unit 21 in the digital camera 2 in variation 1. Here, the processing structure, which does not include the subject observation ambient light condition acquisition unit 33 or the subject observation completely adapted white calculation unit 38, is simplified. Since the specimen 12 is lit with no ambient light and no ambient light enters the visual field of the observer during microscope observation, the absolute luminance $Y_{SW\_abs}$ of the illumination can be regarded as 0. Under these circumstances, expression (6) can be replaced as follows.

[Expression 16]

$$L_{W0} = L_W$$

$$M_{W0} = M_W$$

$$S_{W0} = S_W$$

$$Y_{W0\_abs} = Y_{W\_abs} \quad (16)$$

Even when the ambient light condition during the subject observation is not taken into consideration as in this case, the adapted white point for the subject observation and the adapted white point for the display image observation are each calculated by factoring in the influence of the other viewing condition, assuring accurate color reproduction. It is to be noted that variation 1 is equivalent to the first embodiment provided that $R_{mix}$ for the subject observation assumes the value of 1.

-Variation 2-

In the first embodiment described above, the subject observation adapted white calculation unit 41 calculates the adapted white point for the subject observation by taking into consideration the display image observation adapted white point. However, in a restricted subject viewing condition such as that of a digital camera 2 exclusively used in microscope applications, a relationship expressed as; $Y_{W\_abs} \gg Y_{W\_abs}'$ exists with regard to the illumination light levels of the microscope 1 and the monitor 3, as explained earlier. In addition, since visual perception normally becomes adapted at a rate of 50% or more over the initial short period of time and the process of adaptation slows down further toward the complete adaptation, as indicated in the graph presented in FIG. 4, $R_{tmp}$ and $(1-R_{tmp})$ may be assumed to have a relationship expressed as $R_{tmp} > (1-R_{tmp})$. Accordingly, expression (7) may be simplified as follows without significantly compromising the color appearance.

[Expression 17]

$$L_{W1} \approx L_{W0}$$

$$M_{W1} \approx M_{W0}$$

$$S_{W1} \approx S_{W0} \quad (17)$$

Figure 6:
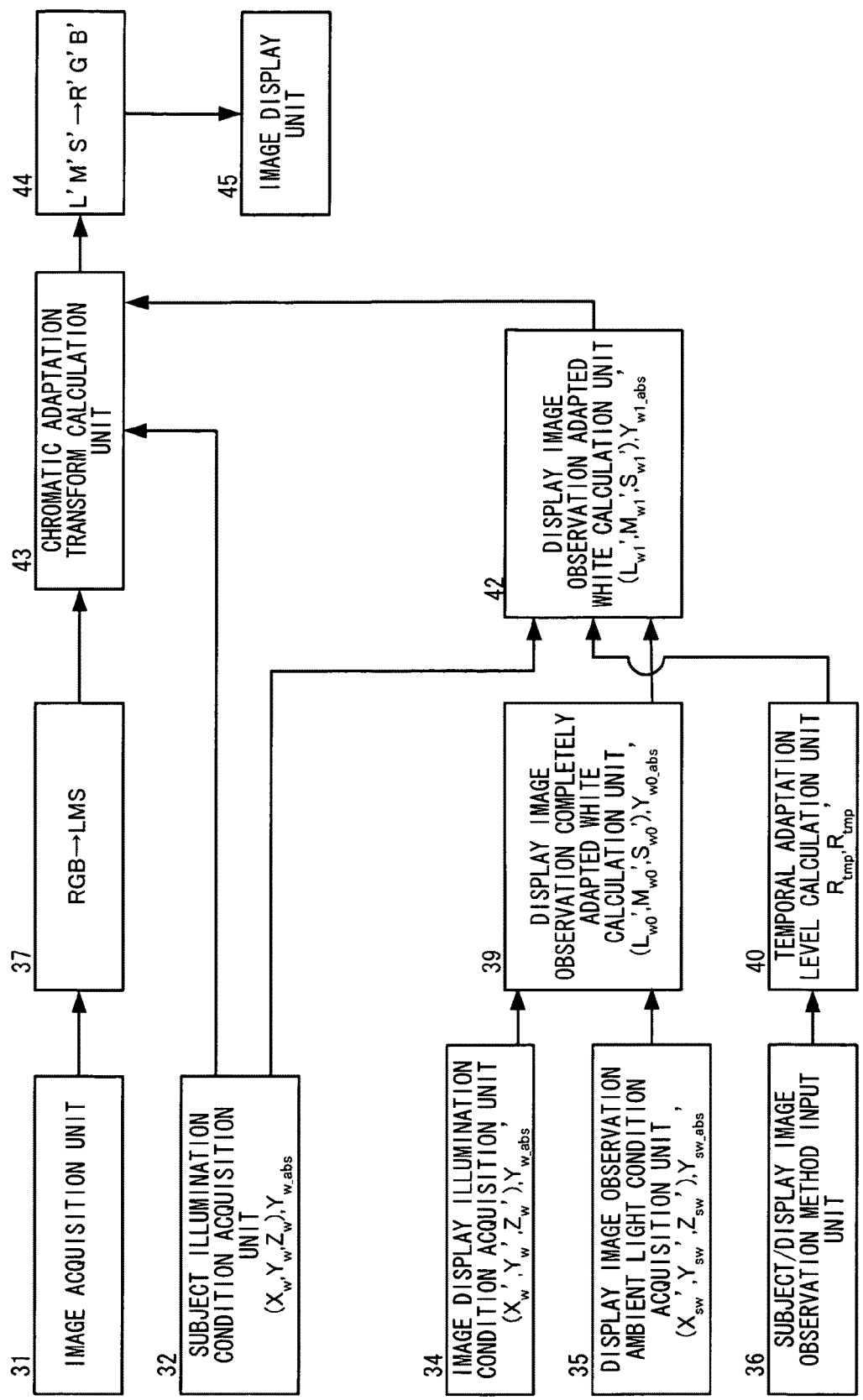
FIG. 6 shows a block diagram illustrating the processing executed by the control unit 21 in the digital camera 1 in variation 2 of the first embodiment.

FIG. 6 is a block diagram of the processing executed by the control unit 21 in the digital camera 2 in variation 2. The processing structure, which does not include the subject observation adapted white calculation unit 41, is further simplified over that shown in FIG. 5 showing the processing executed in variation 1. Since the adapted white point for the display image observation, at least, is calculated by taking into consideration the influences of the different viewing conditions on each other, accurate color reproduction at the monitor 3 is assured. It is to be noted that variation 2 is equivalent to the first embodiment provided that $R_{mix}$ and $R_{tmp}$ for the subject observation both assume a value of 1.

-Variation 3-

The first embodiment is described by assuming that a fixed value is selected for the temporal adaptation level $R_{tmp}'$ for observation of the image at the monitor 3. However, the state of adaptation changes as indicated in the graph presented in FIG. 4 as time elapses while viewing the monitor. Accordingly, $R_{tmp}'$ may be gradually adjusted in correspondence to the length of monitor observation time based upon the graph in FIG. 4 and the color conversion may also be gradually adjusted as time elapses, so as to ensure that the color appearance is accurately reproduced at all times.

Figure 10A:
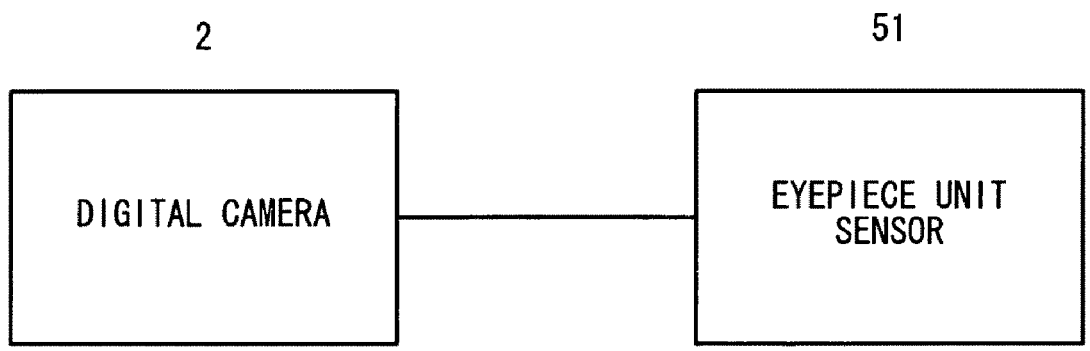
FIGS. 10A and 10B show examples of time counting methods that may be adopted when measuring the length of observation time at the monitor 3.

FIG. 10 present examples of measuring methods that may be adopted when measuring the length of observation time at the monitor 3. FIG. 10A illustrates a method whereby the output from a sensor 51 mounted at the eyepiece unit of the microscope 1 is input to the digital camera 2. The sensor 51 is activated as the observer looks into the eyepiece lens 14 and the digital camera 2 detects the active state of the sensor. The digital camera 2 judges that the observer is looking into the microscope 1 as long as the sensor 51 is in the active state but otherwise judges that the observer is not looking into the eyepiece unit and is, instead, observing the image at the monitor 3. Through this method, the length of time over which the microscope observation is conducted, too, can be measured accurately. This means that the temporal adaptation level $R_{tmp}$ for the microscope observation, too, may be calculated based upon the length of microscope observation time and the graph presented in FIG. 4 and that the calculated value may be used in the color conversion.

Figure 10B:
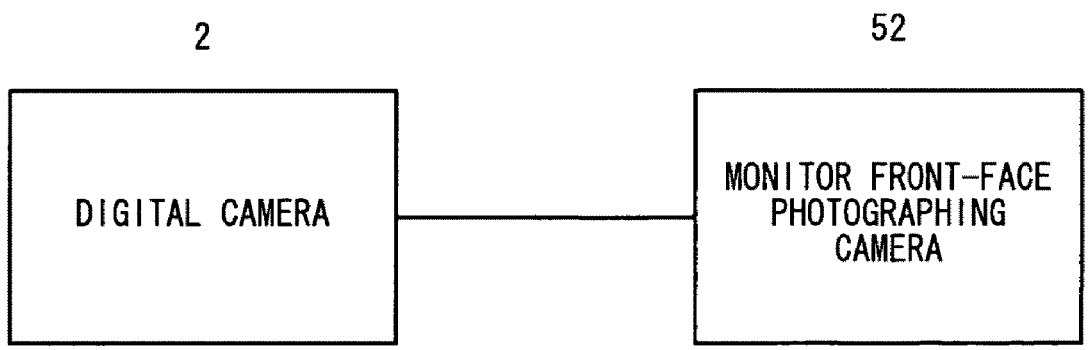

FIG. 10B shows a method whereby the output from a monitor front-face photographing camera 52 mounted at the monitor 53 is input to the digital camera 2. Based upon the output from the monitor front-face photographing camera 52, the digital camera 2 recognizes a person's face and once a person's face is recognized, it starts a monitor observation time count and ends the monitor observation time count as soon as the person's face is no longer recognized. The monitor observation time is thus measured. It is to be noted that the digital camera may further make a decision as to whether or not the face is oriented straight ahead (toward the monitor) so as to calculate the length of time over which the observation is conducted at the monitor 3 based upon the length of time over which the face remains turned toward the monitor. In addition, the processing described above may instead be executed within the monitor front-face photographing camera 52 and the information indicating the length of observation time at the monitor 3 alone may be output to the digital camera 2. Furthermore, the length of time over which the observation is conducted at the monitor 3 may be measured through a different method.

Second Embodiment

In the processing described in reference to the first embodiment, the illumination conditions in the two viewing conditions are individually obtained and the respective white points are determined through a plurality of calculation sessions. In the second embodiment explained in detail below, which may be adopted when a specific illumination condition and a specific observation condition are set in advance as part of a standard viewing condition, a plurality of matrices, which may be used in the chromatic adaptation transform, are determined and stored in a lookup table or the like in advance so as to execute the optimal chromatic adaptation transform by switching them in correspondence to the conditions input to the subject/display image observation method input unit 36.

Figure 7:
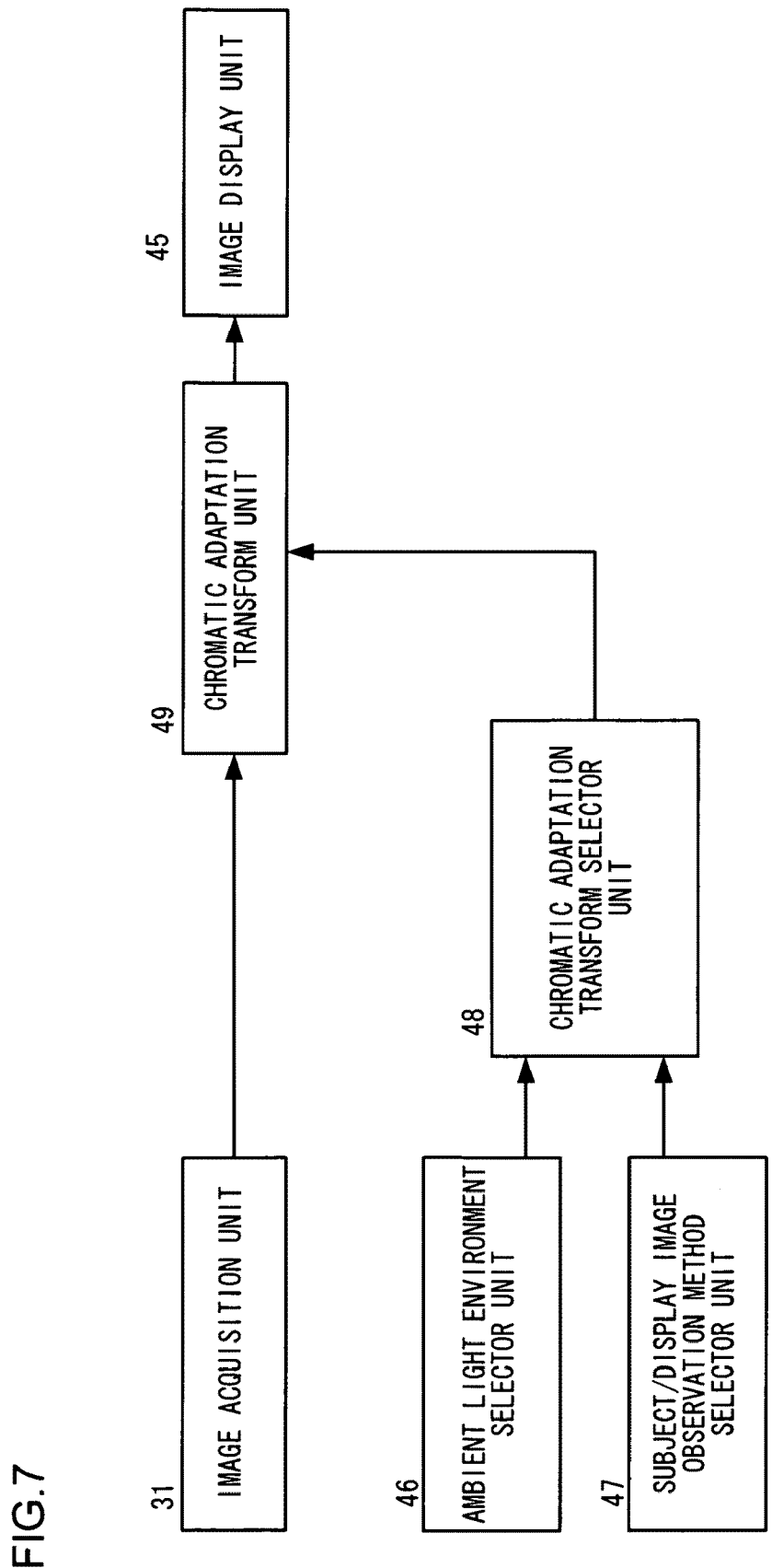
FIG. 7 shows a block diagram illustrating the processing executed by the control unit 21 in the digital camera 1 in a second embodiment.

The microscope observation system in the second embodiment is similar to that achieved in the first embodiment illustrated in FIGS. 1 and 2, and a repeated explanation is not provided. FIG. 7 is a block diagram illustrating the processing executed by the control unit 21 in the digital camera 2 in the second embodiment.

It is assumed that as a camera photographing mode switch (not shown) is turned on, preselected values are set for the subject illumination white point ($X_W$, $Y_W$, $Z_W$) and the illumination luminance $Y_{W\_abs}$ representing the microscope viewing condition. In addition, the viewing condition in which the image brought up on display at the monitor 3 is observed may be either of the following two modes; the sRGB standard viewing condition (device color temperature=D65, device luminance=80 Cd/m$^2$, ambient light level=4.1 Cd/m$^2$) and an environment similar to the sRGB standard viewing condition except that a higher level of light such as that in a regular office environment (approximately 160 Cd/m$^2$) is assumed for the ambient light level. In relation to the temporal adaptation levels $R_{tmp}$ and $R_{tmp}'$, either of the following two modes; $R_{tmp}=R_{tmp}'=0.8$ for "monitor observation conducted in combination with microscope observation" and $R_{tmp}=R_{tmp}'=1.0$ for "observation of monitor display image alone or for image save" may be selected.

For each of the four different combination modes set by selecting either the sRGB standard viewing condition mode or the standard office environment mode and selecting either of the mode for "monitor observation conducted in combination with microscope observation" or the mode for "observation of monitor display image only or for image save", a matrix C is calculated in advance as expressed in (14) through the method having been described in reference to the first embodiment and the calculated matrices are stored into the memory 23 in the digital camera 2. FIG. 8 shows a table having stored therein matrices 1~4 corresponding to the four modes.

As in the first embodiment, the image acquisition unit 31 obtains a photographic image, i.e., image data, of the microscope image. An ambient light environment selector unit 46 selects either "A dim (corresponds to the sRGB environment)" or "B bright room", whichever is closer to the surrounding environment in which the subject, i.e., the microscope image, is observed. The ambient light environment selector unit 46 may select either option based upon the photometering results provided from a photometering sensor (not shown) in the digital camera 2 or based upon the detection results provided from a dedicated sensor (not shown). Alternatively, the ambient light environment selector unit may prompt the observer to specify the type of surrounding environment in a menu screen.

A subject/display image observation method selector unit 47 selects either the mode for "1 monitor observation conducted in combination with microscope observation" or the mode for "2 observation of monitor display image alone or for image save", whichever better approximates the current situation. This selection may be made by prompting the observer to specify either option in a menu screen.

A chromatic adaptation transform selector unit 48 selects the optimal matrix C, as illustrated in FIG. 7, based upon the selections made via the ambient light environment selector unit 46 and the subject/display image observation method selector unit 47. A chromatic adaptation transform unit 49 then executes a chromatic adaptation transform for each of the pixels constituting the image obtained by the image acquisition unit 31, by using the matrix C having been selected by the chromatic adaptation transform selector unit 48 and the expression (15) having been referred to in the description of the first embodiment. The image data resulting from the chromatic adaptation transform are then brought up on display at the monitor 3 via the image display unit 45.

The following advantage is achieved through the second embodiment described above.

(1) A plurality of color conversion matrices, prepared in advance, are stored in the memory and color conversion is executed by using the optimal matrix corresponding to the current conditions. As a result, optimal color reproduction is achieved quickly through a simple structure. This is bound to prove particularly advantageous when the illumination conditions and the observation conditions are known in advance. It is to be noted that since the plurality of color conversion matrices are prepared in advance based upon the adapted white points calculated by taking into consideration the influences of the different viewing conditions on each other, as has been described in reference to the first embodiment, highly accurate color reproduction comparable to that achieved in the first embodiment is enabled.

Third Embodiment

In the first embodiment, the present invention is adopted in a microscope observation system. Such a method adopted to assure optimal color reproduction in a microscope system may also be adopted when a target object placed on a desktop is photographed with the digital camera 2 and displayed on the monitor 3. Accordingly, an application example in which a target object on a desktop is photographed with the digital camera 2 and the appearance of the color of the target object on the desktop is optimally reproduced on the monitor 3 is described in reference the third embodiment.

Figure 9:
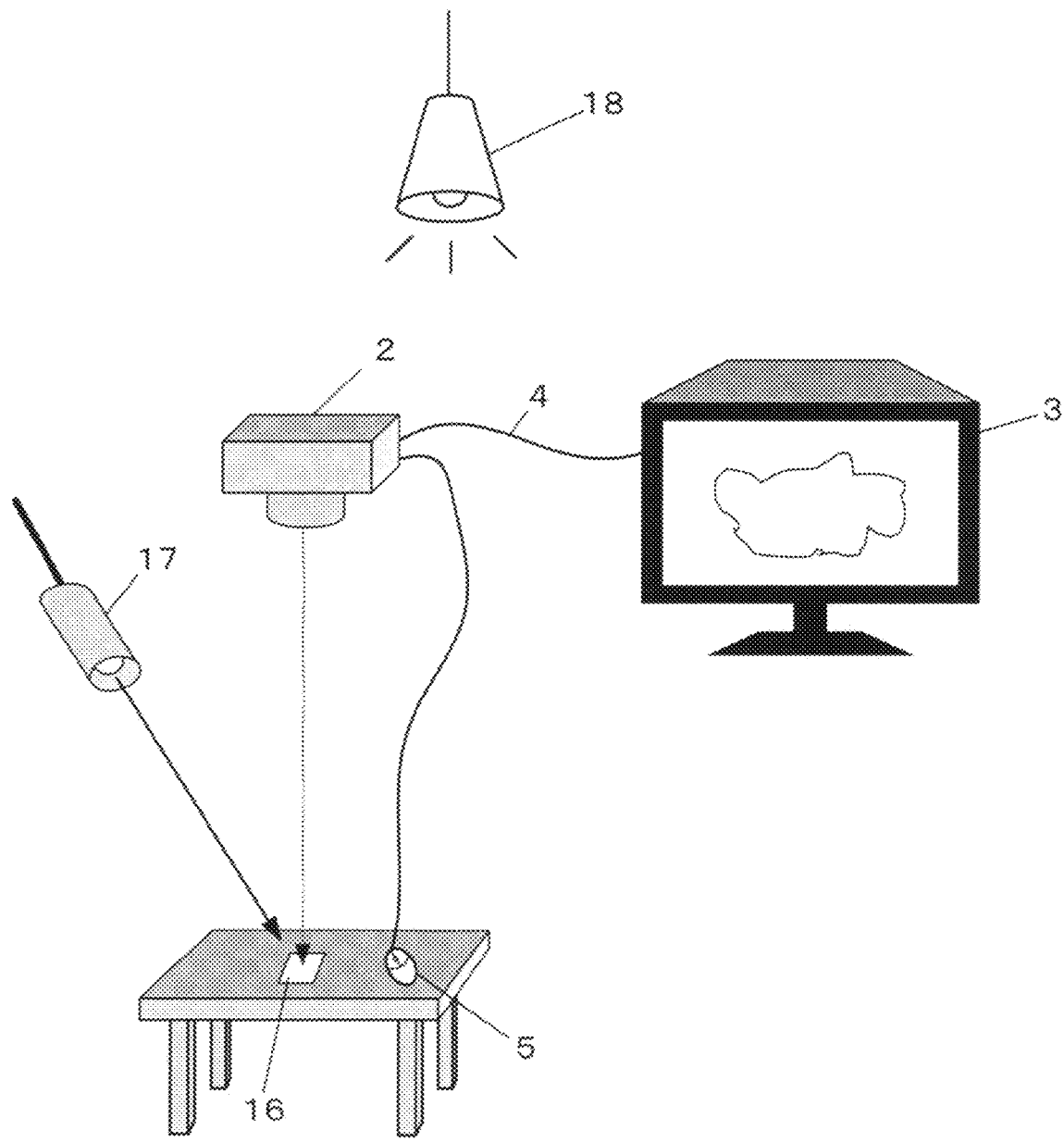
FIG. 9 shows a desktop work system achieved in a third embodiment.

FIG. 9 illustrates the desktop work system achieved in the third embodiment. A target object 16 placed on the desktop is illuminated by a spotlight 17. In addition, regular room lighting 18 is installed in the room. The digital camera 2 captures an image of the target object 16 on the desktop and brings up on display at the monitor 3 the image of the target object 16 taking on a color that matches the color of the target object on the desktop.

Such a desktop work system may be utilized when evaluating a newly-developed product placed on the desktop during a presentation, evaluating a publication, a design, an art object or the like. However, applications in which the desktop work system may be utilized are not limited to these examples and it may be utilized in a wide range of diverse applications. The target object 16 may be a printed object (printout) or the actual object.

The digital camera 2, the monitor 3, the cable 4 and the mouse 5 are similar to those in the first embodiment. Accordingly, the following description is provided in reference to FIGS. 2 and 3 illustrating the first embodiment.

The third embodiment differs from the first embodiment only in that the target object 16 is directly observed with the naked eye instead of through a microscope and that different types of illumination are used. Accordingly, the image processing executed in the first embodiment can be directly adopted in the third embodiment. The following explanation thus focuses on outlining how the illumination conditions are ascertained in the third embodiment and the description of the first embodiment should be referred to for specific details of the processing.

The image acquisition unit 31 obtains image data constituting an image of the target object 16 expressed in the RGB colorimetric system, which are output from the imaging unit 22. The subject illumination condition acquisition unit 32 obtains the white point $(X_W, Y_W, Z_W)$ of the spotlight 17 that illuminates the target object 16, and the absolute luminance $Y_{W\_abs}$ of the spotlight 17. A subject observation ambient light condition acquisition unit 33 obtains the white point $(X_{SW}, Y_{SW}, Z_{SW})$ of the interior ambient light 18 and the absolute luminance $Y_{SW\_abs}$ of the illumination 18. As in the first embodiment, an image display illumination condition acquisition unit 34 obtains a white point $(X_W', Y_W', Z_W')$ of the monitor 3 at which an image resulting from a chromatic adaptation transform is brought up on display and the absolute luminance $Y_{W\_abs}'$ of the monitor 3. The display image observation ambient light condition acquisition unit 35 obtains the white point $(X_{SW}', Y_{SW}', Z_{SW}')$ of the interior illumination 18, which is the ambient light provided in the environment in which the image on display at the monitor 3 is observed and the absolute luminance $Y_{SW\_abs}'$ of the interior illumination 18.

The subject/display image observation method input unit 36 enables the observer to indicate in a menu screen that the display image on the monitor 3 is an image to be observed while the target object on the desktop is being observed with the naked eye, an image to be saved or an image to be observed simply as a monitor display image at a remote location away from the desk.

Based upon the image data, the illumination conditions and the subject/display image observation method ascertained as described above, color conversion processing comparable to that executed in the first embodiment is executed so as to assure the optimal reproduction of the appearance of the color of the target object 16 on the desktop via at the monitor 3. As a result, color reproduction whereby the color of the target object 16 on the desktop observed with the naked eye is faithfully reproduced in the image of the target object 16 brought up on display at the monitor 3 is achieved and desk top work is optimized.

Fourth Embodiment

In the fourth embodiment, processing similar to the processing in the first embodiment is executed by further taking into consideration an adaptation factor indicating the extent of incomplete adaptation under the microscope observation illumination condition and an adaptation factor indicating the extent of incomplete adaptation under the display image observation illumination condition. The fourth embodiment is characterized in that further accuracy in color reproduction is assured by adjusting the adaptation factors indicating the extents of incomplete adaptation in conformance to the hue of the conversion target color.

Since the microscope observation system in the fourth embodiment is similar to that achieved in the first embodiment described in reference to FIGS. 1 and 2, a repeated explanation is not provided.

(Results of Color Appearance Tests)

In a color appearance test, a highly qualified specialist in the appearance of color is asked to select colors of similar appearance in two viewing conditions having different color temperatures. Through such color appearance tests in which the specialist selects a color closest in appearance to the reference color among a plurality of colors resulting from color conversion executed by adjusting the adaptation factors in the viewing conditions with different color temperatures, results indicating how an optimal adaptation factor D changes dependently upon the hue, are obtained.

A reference color $A(h^*)$ is displayed in a viewing condition with a color temperature $T_1$. The reference color $A(h^*)$ is represented by the hue $h^*$. It is to be noted that the hue $h^*$ is indicated as a hue angle. The results obtained through CIECAM02 color conversion executed on the reference color $A(h^*)$ by taking into consideration the difference between the color temperatures $T_1$ and $T_2$ are displayed in the viewing condition with the color temperature $T_2$. At this time, a plurality of color options $B(h^*)$ (D) in a range of D=0.0~1.0 are displayed as adaptation factor options, instead of a single value that may be estimated based upon the viewing conditions such as the illumination brightness and the ambient light level. The specialist compares the appearance of the color $A(h^*)$ observed in the viewing condition with a color temperature $T_1$ with the appearances of the colors $B(h^*)$ (D) (D=0.0 . . . , 1.0) observed in the viewing condition with the color temperature $T_2$ and selects a color $B(h^*)$ ($D_{h*}$) closest in appearance to $A(h^*)$. This test procedure is executed for a plurality of colors assuming various hue angles $h^*$ without changing the brightness or the saturation level of the reference color $A(h^*)$.

Figure 11:
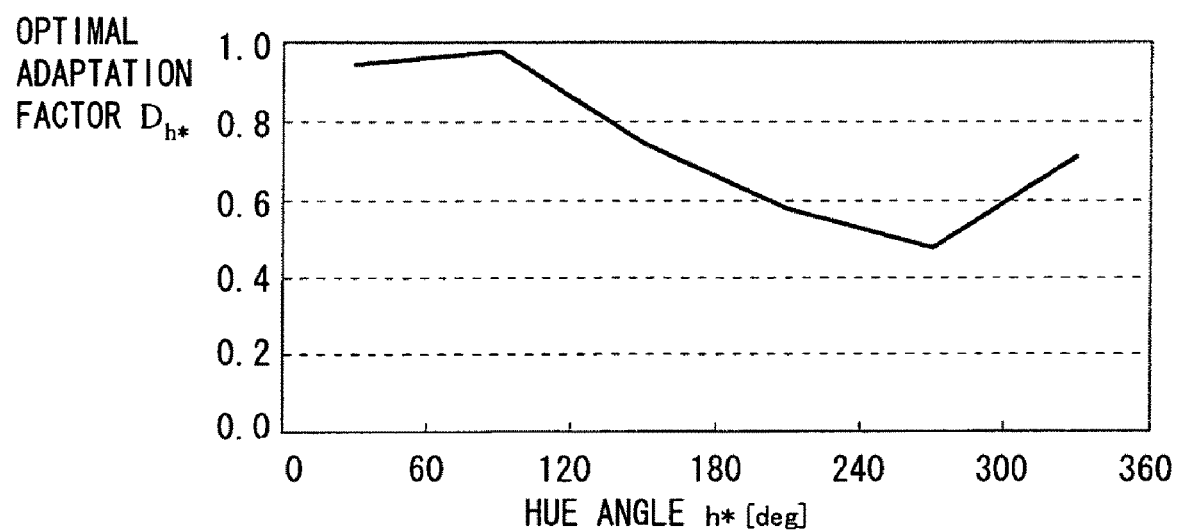
FIG. 11 shows the relationship between the optimal adaptation factor $D_{h^*}$ and the hue angle $h^*$.

A plurality of participants took part in the tests described above a plurality of times and the results presented in FIG. 11 were obtained by collecting the individual test results. In FIG. 11, showing the relationship between the optimal adaptation factor $D_{h*}$ and the hue angle $h^*$, the hue angle $h^*$ (in units of deg) is indicated along the horizontal axis and the participant average value of the optimal adaptation factors $D_{h*}$ selected as the colors closest in appearance in the individual tests is indicated along the vertical axis. Tests were conducted in the embodiment for six colors with different hue angles; $h^*=30°$ (red), $h^*=90°$ (yellow), $h^*=150°$ (green), $h^*=210°$ (cyan), $h^*=270°$ (blue) and $h^*=330°$ (magenta). The results presented in FIG. 11 indicate that the optimal adaptation factor changes in conformance to the hue and that the color appearance is better approximated by increasing $D_{h*}$ when $h^*=90°$ (yellow) and reducing $D_{h*}$ when $h^*=270°$ (blue).

(Conversion Processing)

Figure 12:
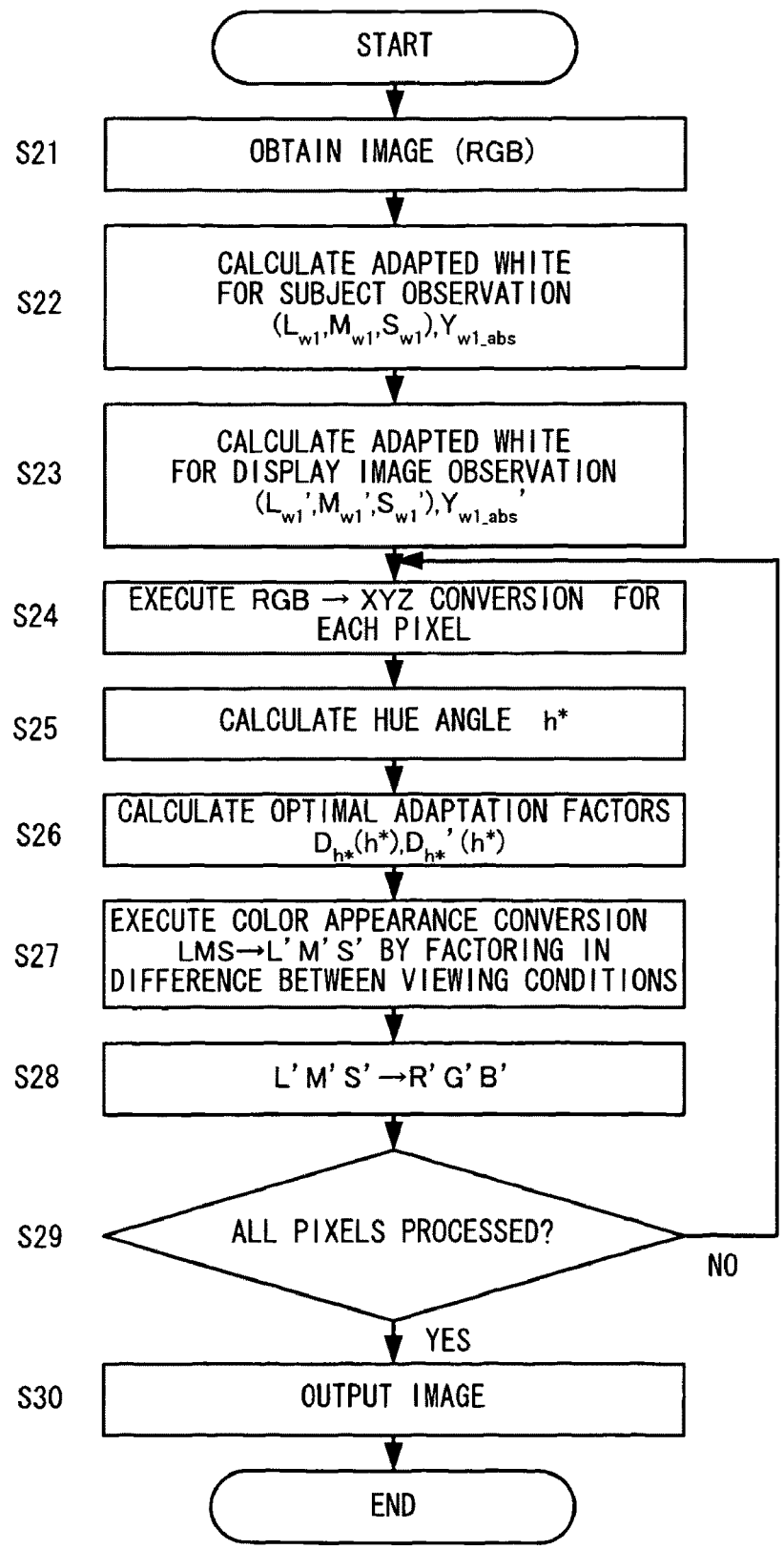
FIG. 12 shows a flowchart of the processing executed in the digital camera 2 in a fourth embodiment.

Next, the color conversion processing is described. FIG. 12 presents a flowchart of the processing executed in the digital camera 2 in the fourth embodiment. The relationship $D_{h*}(h^*)$ between the optimal adaptation factor and the hue, determined through tests similar to those described above, should be stored in the form of a table or an approximating expression into the image processing program in advance.

First, a photographic image is obtained in step S21. The photographic image, constituted of a plurality of pixels, is described in the color space RGB inherent to the spectral sensitivity of the camera.

The operation then proceeds to step S22. In step S22, processing similar to that executed by the subject observation adapted white calculation unit 41 (see FIG. 3) in the first embodiment is executed so as to determine the cone response ($L_{W1}$, $M_{W1}$, $S_{W1}$) of the white point in case that the visual perception of the observer viewing the specimen 12, i.e., the subject, through the microscope 1 is actually adapted and the adapted luminance $Y_{W1\_abs}$ (see expression (7) used in the first embodiment).

In step S23, processing similar to that executed by the display image observation adapted white calculation unit 42 (see FIG. 3) in the first embodiment is executed so as to determine the cone response ($L_{W1}'$, $M_{W1}'$, $S_{W1}'$) of the white point in case that the visual perception of the observer viewing the image displayed at the monitor 3 is actually adapted and the corresponding adapted luminance $Y_{W1\_abs}'$ (see expression (8) used in the first embodiment).

It is to be noted that as processing similar to that executed by the subject observation adapted white calculation unit 41 and processing similar to that executed by the display image observation adapted white calculation unit 42 in the first embodiment are executed, the processing executed by the subject illumination condition acquisition unit 32, the subject observation ambient light condition acquisition unit 33, the image display illumination condition acquisition unit 34, the display image observation ambient light condition acquisition unit 35, the subject/display image observation method input unit 36, the temporal adaptation level calculation unit 40, the subject observation completely adapted white calculation unit and the display image observation completely adapted white calculation unit 39 in the first embodiment is also executed. In addition, the processing described above (the processing phases 32~36 and 38~40 executed in the first embodiment) may instead be executed prior to step S22.

The operation then proceeds to step S24. The processing in steps S24~S28 is repeatedly executed until all the pixels are processed. Since camera RGB data are expressed in the inherent color space RGB determined based upon the camera spectral sensitivity, the data are converted to data in the CIE 1931 XYZ color space by using a predetermined camera RGB→XYZ matrix $M_{RGB \to XYZ}$.

[Expression 18]

$$\begin{pmatrix} X \\ Y \\ Z \end{pmatrix} = M_{RGB \to XYZ} \cdot \begin{pmatrix} R \\ G \\ B \end{pmatrix} \quad (18)$$

The operation then proceeds to step S25 to calculate the hue angle h* of the conversion target pixel. The CIE XYZ data are converted to CIE LAB data and the angle formed in the a*b* coordinate system is calculated in the 0~360° range as the hue angle h*.

In step S26, based upon the relationship $D_{h*}$ (h*) between the optimal adaptation factor and the hue determined in advance by conducting the color appearance tests, the adaptation factor $D_{h*}$ (h*) that provides the optimal color appearance in correspondence to h* calculated in step S25 is determined. Since the adaptation factor is affected by the ambient light and the adapted luminance in the surrounding environment, the optimal adaptation factor takes on different values in correspondence to the photographic viewing condition and the image observation viewing condition. For this reason, an adaptation factor $D_{h*}'$ (h*) for the image observation, too, should be calculated.

In step S27, a color L'M'S' taking on an appearance under the display image observation illumination condition, which is close to the appearance of the color LMS as perceived under the microscope observation illumination condition, is calculated based upon the difference between the viewing conditions having been ascertained in steps S22 and S23 and $D_{h*}$ (h*) and $D_{h*}'$ (h*) having been calculated in step S26. In this step, the chromatic adaptation expression of the von Kries should be used as the color appearance model, as in the first embodiment. By using the von Kries chromatic adaptation expression, color conversion should be executed as expressed in (9) having been referred to in the description of the first embodiment and also as expressed below. It is to be noted that $Y_{W1}$ and $Y_{W1}'$ can be calculated as expressed below based upon ($L_{W1}$, $M_{W1}$, $S_{W1}$) and ($L_{W1}'$, $M_{W1}'$, $S_{W1}'$).

[Expression 19]

$$M_{vonkries} = \begin{pmatrix} \dfrac{L'_{W1,D}}{L_{W1,D}} & 0.0 & 0.0 \\ 0.0 & \dfrac{M'_{W1,D}}{M_{W1,D}} & 0.0 \\ 0.0 & 0.0 & \dfrac{S'_{W1,D}}{S_{W1,D}} \end{pmatrix} \quad (19)$$

[Expression 20]

$$L_{W1,D} = \frac{L_{W1}}{Y_{W1} \cdot D_{h*}(h^*) + L_{W1} \cdot (1 - D_{h*}(h^*))} \quad (20)$$

$$M_{W1,D} = \frac{M_{W1}}{Y_{W1} \cdot D_{h*}(h^*) + M_{W1} \cdot (1 - D_{h*}(h^*))}$$

$$S_{W1,D} = \frac{S_{W1}}{Y_{W1} \cdot D_{h*}(h^*) + S_{W1} \cdot (1 - D_{h*}(h^*))}$$

$$\begin{pmatrix} X_{W1} \\ Y_{W1} \\ Z_{W1} \end{pmatrix} = (M_{CAT02})^{-1} \begin{pmatrix} L_{W1} \\ M_{W1} \\ S_{W1} \end{pmatrix}$$

[Expression 21]

$$L'_{W1,D} = \frac{L'_{W1}}{Y'_{W1} \cdot D'_{h*}(h) + L'_{W1} \cdot (1 - D'_{h*}(h))} \quad (21)$$

$$M'_{W1,D} = \frac{M'_{W1}}{Y'_{W1} \cdot D'_{h*}(h) + M'_{W1} \cdot (1 - D'_{h*}(h))}$$

$$S'_{W1,D} = \frac{S'_{W1}}{Y'_{W1} \cdot D'_{h*}(h) + S'_{W1} \cdot (1 - D'_{h*}(h))}$$

$$\begin{pmatrix} X'_{W1} \\ Y'_{W1} \\ Z'_{W1} \end{pmatrix} = (M_{CAT02})^{-1} \begin{pmatrix} L'_{W1} \\ M'_{W1} \\ S'_{W1} \end{pmatrix}$$

The processing in step S27 is similar to the processing executed by the chromatic adaptation transform calculation unit 43 in the first embodiment. However, since the data in the XYZ space are converted to data in the LMS color space in step S24, RGB→XYZ color space conversion should be first executed as expressed in (2) referred to in the description of the first embodiment and then processing similar to that executed by the chromatic adaptation transform calculation unit 43 is executed in step S27.

The operation proceeds to step S28 to convert the data in the cone response LMS space to photometric value data XYZ and then converts the photometric value data XYZ to sRGB data for image display through processing similar to that executed by the L'M'S'/R'G'B' conversion unit 44 in the first embodiment. It is to be noted that this processing may instead be executed after deciding in step S29 that the color appearance conversion for all the pixels has been completed.

If it is decided in step S29 that the processing for all the pixels has not yet been completed, the operation returns to step S24 to repeat the processing described above. Once the processing for all the pixels is completed, the operation proceeds to step S30 to output the image and then the processing ends.

Through the processing described above, the color appearance can be accurately reproduced even when the microscope observation and the display image observation are conducted under different illumination conditions. The image processing device achieved in the embodiment, which executes color conversion by using the optimal adaptation factor in correspondence to the color, i.e., the hue of the conversion target pixel, is capable of predicting the accurate color appearance with a higher level of reliability.

It is to be noted that the embodiment may be adopted in diverse color conversion methods executed by taking into consideration chromatic adaptation, such as the CIECAM02 color appearance model.

In the fourth embodiment described above, the processing is executed by using the results of tests conducted with regard to hue directions. As an alternative, tests similar to those pertaining to hue directions may also be conducted with regard to directions of saturation (chroma) or lightness and the results of such tests, too, may be utilized in adaptation factor calculation. In such a case, the saturation level should assume a value $C^*=(a^{*2}+b^{*2})^{1/2}$ and the lightness level should assume the value of $L^*$ in the CIE LAB.

In addition, while an explanation is given above on an example in which h*, L* and C* in the CIE LAB are used respectively for the hue, the lightness and the saturation (chroma), parameters in a color space other than the CIE LAB may be utilized instead. For instance, J, C and h parameters indicating the relative lightness, the relative saturation and the relative hue in the CIECAM02 may be utilized.

Fifth Embodiment

The fifth embodiment is similar to the fourth embodiment in that adaptation factors are taken into consideration. The fifth embodiment is characterized in that the color appearance is reproduced even when there is a significant difference between the light levels in the different viewing conditions and particularly in that the visual characteristics whereby the image appears to assume a high level of contrast when there is a significant brightness difference are rendered with ease.

Since the microscope observation system in the fifth embodiment is similar to that achieved in the first embodiment described in reference to FIGS. 1 and 2, a repeated explanation is not provided.

Figure 13:
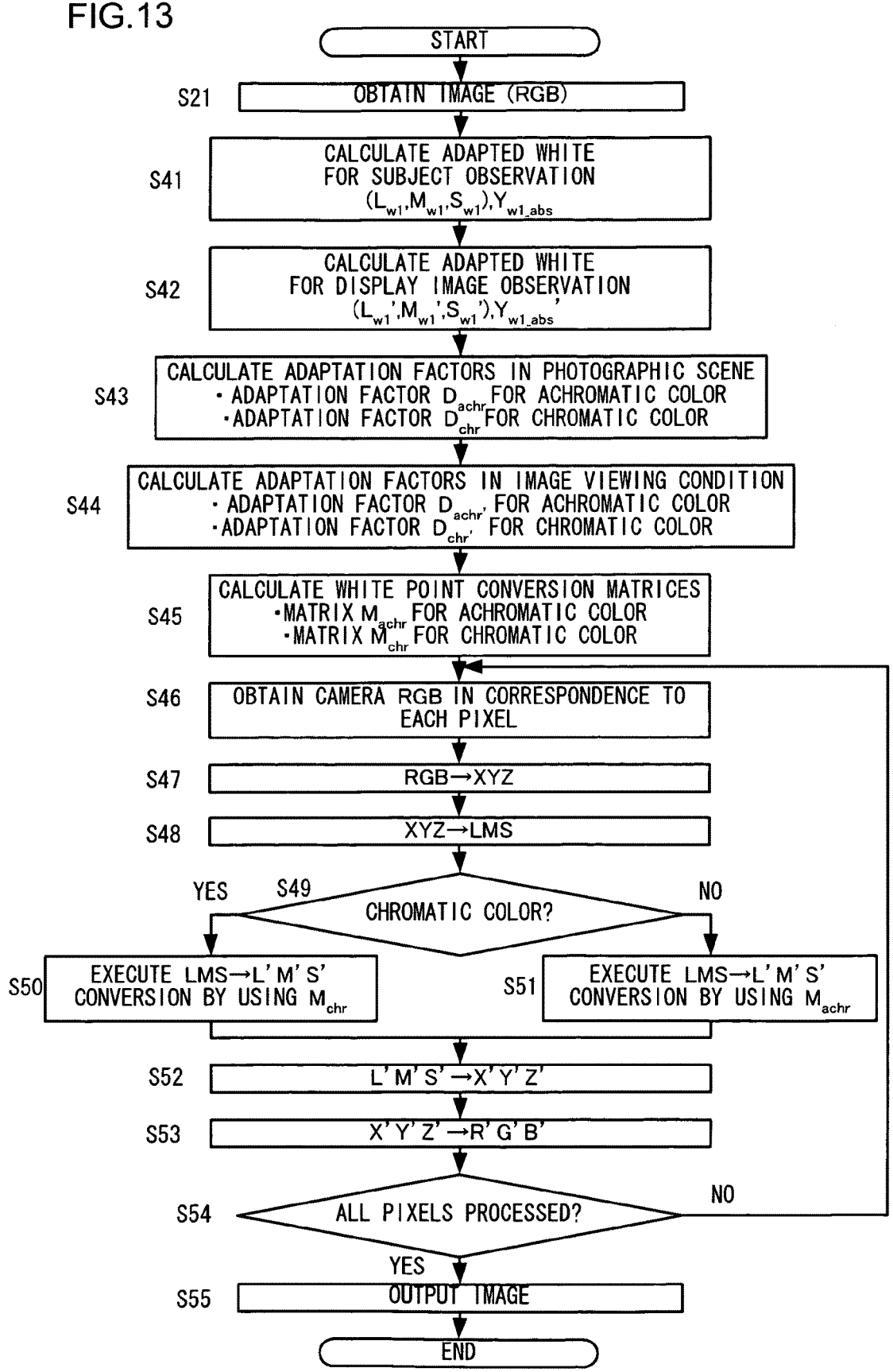
FIG. 13 shows a flowchart of the image processing program executed in the digital camera 2 in a fifth embodiment

FIG. 13 presents a flowchart of the image processing program executed in the digital camera 2 in the fifth embodiment.

First, a photographic image is obtained in step S21, as in the fourth embodiment (see FIG. 12). The photographic image is described in the color space RGB inherent to the spectral sensitivity of the camera.

The operation then proceeds to step S41. In step S41, processing similar to that executed by the subject observation adapted white calculation unit 41 (see FIG. 3) in the first embodiment is executed so as to determine the cone response ($L_{W1}$, $M_{W1}$, $S_{W1}$) of the white point in case that the visual perception of the observer viewing the specimen 12, i.e., the subject, through the microscope 1 is actually adapted and the corresponding adapted luminance $Y_{W1\_abs}$ (see expression (7) used in the first embodiment), as in the fourth embodiment.

In step S42, processing similar to that executed by the display image observation adapted white calculation unit 42 (see FIG. 3) in the first embodiment is executed so as to determine the cone response ($L_{W1}'$, $M_{W1}'$, $S_{W1}'$) of the white point in case that the visual perception of the observer viewing the image displayed at the monitor 3 is actually adapted and the corresponding adapted luminance $Y_{W1\_abs}'$ (see expression (8) used in the first embodiment), as in the fourth embodiment.

In step S43, an adaptation factor $D_{achr}$ for an achromatic color and an adaptation factor $D_{chr}$ for a chromatic color are calculated based upon the subject observation illumination conditions having been ascertained in step S41 via the subject illumination condition acquisition unit 32 and the subject observation ambient light condition acquisition unit 33 in FIG. 3. $D_{chr}$ may assume a value such as that calculated as indicated in the expression below, which is defined in the CIECAM02.

[Expression 22]

$$D_{chr} = F\left[1 - \left(\frac{1}{3,6}\right)e^{\left(\frac{-(L_A+42)}{92}\right)}\right] \quad (22)$$

The adapted luminance $L_a$ normally assumes the value expressed as; $L_a=Y_{W1\_abs}/5$. F is a parameter determined in correspondence to the ratio of the device luminance and the ambient light level. The adaptation factor $D_{achr}$ for an achromatic color (white or gray), should be set to 1.0, by taking into consideration the tendency in human visual perception whereby white is still perceived as white (closer to the complete adaptation) in case of the high luminance even when the color of the illuminating light changes. Such characteristics in human visual perception render the appearance of contrast over an area where the specimen is present (a stained area taking on a chromatic color) and an area where the specimen is not present (an area with no stain taking on an achromatic appearance) in, for instance, an image observed at a biological microscope.

Next, in step S44, an adaptation factor $D_{achr}'$ for achromatic color and an adaptation factor $D_{chr}'$ for chromatic color in the viewing condition in which the display image is observed are calculated based upon the display image viewing conditions having been ascertained in step S42 via the image display illumination condition acquisition unit 34 and the display image ambient light condition acquisition unit 35. The adaptation factor $D_{chr}'$ for chromatic color can be calculated through processing similar to that executed in step S43, by using the adapted luminance $L_A'$ at which the image observation is conducted and a parameter F' that is determined in correspondence to the ambient light level.

[Expression 23]

$$D_{chr}' = F'\left[1 - \left(\frac{1}{3,6}\right)e^{\left(\frac{-(L_A'+42)}{92}\right)}\right] \quad (23)$$

[Expression 24]

$$L'_A = Y'_{W1\_abs}/5 \qquad (24)$$

In addition, the adaptation factor $D_{achr}'$ for achromatic color is set to 1.0.

In step S45, white point conversion matrices (a matrix $M_{achr}$ for a chromatic color and a matrix $M_{chr}$ for chromatic color) are calculated by using the data obtained or calculated in steps S41~S44. The white point conversion is executed in the LMS space, which is a color space better approximating the human cone response.

In this step, $M_{chr}$ and $M_{achr}$ are calculated as expressed below.

[Expression 25]

$$M_{chr} = \begin{pmatrix} \dfrac{L'_{W1,chr}}{L_{W1,chr}} & 0.0 & 0.0 \\ 0.0 & \dfrac{M'_{W1,chr}}{M_{W1,chr}} & 0.0 \\ 0.0 & 0.0 & \dfrac{S'_{W1,chr}}{S_{W1,chr}} \end{pmatrix} \qquad (25)$$

[Expression 26]

$$M_{achr} = \begin{pmatrix} \dfrac{L'_{W1,achr}}{L_{W1,achr}} & 0.0 & 0.0 \\ 0.0 & \dfrac{M'_{W1,achr}}{M_{W1,achr}} & 0.0 \\ 0.0 & 0.0 & \dfrac{S'_{W1,achr}}{S_{W1,achr}} \end{pmatrix} \qquad (26)$$

provided that

[Expression 27]

$$L_{W1,chr} = \dfrac{L_{W1}}{Y_{W1} \cdot D_{chr} + L_{W1} \cdot (1 - D_{chr})}$$

$$M_{W1,chr} = \dfrac{M_{W1}}{Y_{W1} \cdot D_{chr} + M_{W1} \cdot (1 - D_{chr})}$$

$$S_{W1,chr} = \dfrac{S_{W1}}{Y_{W1} \cdot D_{chr} + S_{W1} \cdot (1 - D_{chr})}$$

$$\begin{pmatrix} X_{W1} \\ Y_{W1} \\ Z_{W1} \end{pmatrix} = (M_{CAT02})^{-1} \begin{pmatrix} L_{W1} \\ M_{W1} \\ S_{W1} \end{pmatrix} \qquad (27)$$

[Expression 28]

$$L'_{W1,chr} = \dfrac{L'_{W1}}{Y'_{W1} \cdot D'_{chr} + L'_{W1} \cdot (1 - D'_{chr})}$$

$$M'_{W1,chr} = \dfrac{M'_{W1}}{Y'_{W1} \cdot D'_{chr} + M'_{W1} \cdot (1 - D'_{chr})}$$

$$S'_{W1,chr} = \dfrac{S'_{W1}}{Y'_{W1} \cdot D'_{chr} + S'_{W1} \cdot (1 - D'_{chr})}$$

$$\begin{pmatrix} X'_{W1} \\ Y'_{W1} \\ Z'_{W1} \end{pmatrix} = (M_{CAT02})^{-1} \begin{pmatrix} L'_{W1} \\ M'_{W1} \\ S'_{W1} \end{pmatrix} \qquad (28)$$

[Expression 29]

$$L_{W1,achr} = \dfrac{L_{W1}}{Y_{W1} \cdot D_{achr} + L_{W1} \cdot (1 - D_{achr})}$$

$$M_{W1,achr} = \dfrac{M_{W1}}{Y_{W1} \cdot D_{achr} + M_{W1} \cdot (1 - D_{achr})}$$

$$S_{W1,achr} = \dfrac{S_{W1}}{Y_{W1} \cdot D_{achr} + S_{W1} \cdot (1 - D_{achr})} \qquad (29)$$

[Expression 30]

$$L'_{W1,achr} = \dfrac{L'_{W1}}{Y'_{W1} \cdot D'_{achr} + L'_{W1} \cdot (1 - D'_{achr})}$$

$$M'_{W1,achr} = \dfrac{M'_{W1}}{Y'_{W1} \cdot D'_{achr} + M'_{W1} \cdot (1 - D'_{achr})}$$

$$S'_{W1,achr} = \dfrac{S'_{W1}}{Y'_{W1} \cdot D'_{achr} + S'_{W1} \cdot (1 - D'_{achr})} \qquad (30)$$

The operation then proceeds to step S46. In step S46, camera RGB data are obtained in correspondence to the individual pixels constituting the image obtained in step S21. Since camera RGB data are expressed in the inherent color space RGB determined based upon the camera spectral sensitivity, the data are converted to CIE 1931 XYZ color space, which is not device-dependent, by using a predetermined camera RGB→XYZ matrix $M_{RGB \to XYZ}$, in step S47.

[Expression 31]

$$\begin{pmatrix} X \\ Y \\ Z \end{pmatrix} = M_{RGB \to XYZ} \cdot \begin{pmatrix} R \\ G \\ B \end{pmatrix} \qquad (31)$$

The operation then proceeds to step S48 to convert the data to data in the LMS space by using $M_{CAT02}$, identical to that used in the first embodiment.

[Expression 32]

$$\begin{pmatrix} L \\ M \\ S \end{pmatrix} = M_{CAT02} \cdot \begin{pmatrix} X \\ Y \\ Z \end{pmatrix} \qquad (32)$$

The operation proceeds to step S49 to make a decision as to whether the target pixel holds chromatic color data or not (achromatic color data). The target pixel is judged to hold chromatic color data if $C^* \geq C^*_0$ but is judged to hold achromatic color data if $C^* \leq C^*_0$ by converting the CIE XYZ data to CIE LAB data and referencing the saturation level $C^* = (a^{*2}+b^{*2})^{1/2}$ and a threshold value $C^*_0$.

If an affirmative decision, i.e., the target pixel holds chromatic color data, is made in step S49, the operation proceeds to step S50 to execute white point conversion by using $M_{chr}$, having been created in step S45.

[Expression 33]

$$\begin{pmatrix} L' \\ M' \\ S' \end{pmatrix} = M_{chr} \cdot \begin{pmatrix} L \\ M \\ S \end{pmatrix} \qquad (33)$$

If a negative decision, i.e., the target pixel holds achromatic color data, is made in step S49, the operation proceeds to step S51 to execute white point conversion by using $M_{achr}$, having been created in step S45.

[Expression 34]

$$\begin{pmatrix} L' \\ M' \\ S' \end{pmatrix} = M_{achr} \cdot \begin{pmatrix} L \\ M \\ S \end{pmatrix} \quad (34)$$

In step S52, color conversion, which is the reverse of the conversion executed in step S48, is executed to convert the data in the LMS color space to data in the XYZ color space.

[Expression 35]

$$\begin{pmatrix} X' \\ Y' \\ Z' \end{pmatrix} = (M_{CAT02})^{-1} \cdot \begin{pmatrix} L' \\ M' \\ S' \end{pmatrix} \quad (35)$$

In step S53, the X'Y'Z' data are converted to data in the color space R'G'B', in which the output image is to be expressed. $M_{XYZ \to sRGB}$ is a matrix used when converting XYZ data to data in the color space RGB, in which the output image is expressed and, accordingly, assuming that the output image is expressed in the color space sRGB, the matrix determined in conformance to the specifications should be used as $M_{XYZ \to sRGB}$.

[Expression 36]

$$\begin{pmatrix} R' \\ G' \\ B' \end{pmatrix} = M_{XYZ \to sRGB} \cdot \begin{pmatrix} X' \\ Y' \\ Z' \end{pmatrix} \quad (36)$$

If it is decided in step S54 that the processing for all the pixels has not yet been completed, the operation returns to step S46 to repeat the processing described above. Once the processing for all the pixels is completed, the operation proceeds to step S55 to output the image and then the processing ends.

Through the processing described above, the color appearance can be reproduced with ease simply by adjusting the adaptation factors in correspondence to the saturation level even when there is a significant difference of 50% or more between the illumination luminance at which the microscope observation scene is illuminated and the illumination luminance of the photographic image display observation. The advantages of the embodiment will prove particularly effective if the brightness ratio of the luminance for the microscope observation and the luminance for the monitor observation is significant. In addition, the adaptation factor for a chromatic color such as white is adjusted to assume a high value, whereas the adaptation factor for chromatic color is adjusted to assume a low value (so as to achieve color reproduction better reflecting the light source color). As a result, the color conversion is executed so as to reproduce color by reflecting the characteristics of human visual perception, whereby the contrast is perceived to be further intensified at a higher luminance.

(Variation of the Fifth Embodiment)

It is to be noted that two matrices, each integrating the matrices used in steps S47~S53 as expressed below, may be calculated in advance in step S45.

[Expression 37]

$$M_{chr} = M_{XYZ \to sRGB} \cdot (M_{CAT02})^{-1} \cdot M_{chr}' \cdot M_{CAT02} \cdot M_{RGB \to XYZ} \quad (37)$$

[Expression 38]

$$M_{achr} = M_{XYZ \to sRGB} \cdot (M_{CAT02})^{-1} \cdot M_{achr}' \cdot M_{CAT02} \cdot M_{RGB \to XYZ} \quad (38)$$

In this case, the processing in steps S47, S48, S52 and S53 does not need to be executed and the operation can proceed directly from step S46 to step S49. If an affirmative decision is made in step S49, the processing proceeds to step S50 to convert the RGB data to R'G'B' data by using $M_{chr}'$ instead of $M_{chr}$, before proceeding to step S54. If a negative decision is made in step S49, the processing proceeds to step S51 to convert the RGB data to R'G'B' data by using $M_{achr}'$ instead of $M_{achr}$, before proceeding to step S54. Since the processing in steps S47, S48, S52 and S53 is skipped, the processing load is reduced.

Sixth Embodiment

The sixth embodiment is similar to the fourth and fifth embodiments in that adaptation factors are taken into consideration. In the fourth and fifth embodiments, the adaptation factor D is adjusted in correspondence to the color (the hue, the saturation level or the like) of each target pixel undergoing the color conversion. In the sixth embodiment, the pixels constituting the image data are grouped into areas each made up with a plurality of pixels present in the area, a representative color for each area is determined and an optimal adaptation factor D to be used in the pixel conversion within the area is determined based upon the representative color (the hue, the saturation level or the like) instead of executing color conversion on the individual pixels. Namely, the color (hue, saturation level or the like) distribution in the image data is analyzed and the adaptation factor is determined based upon the color distribution resulting from the analysis.

The image data may be divided into areas by dividing the image data into areas each corresponding to a given subject based upon edge extraction results or by dividing the image into blocks. The adaptation factor D determined for each area corresponding to a given subject defined based upon the edge extraction results changes in a manner faithfully reflecting the outline of the particular subject and thus, the converted image does not take on any unnatural look such as a change in D manifesting as a noticeable boundary.

If the image data are divided into blocks and the adaptation factor D is adjusted to assume different values in correspondence to the individual block areas, D used in a given area becomes discontinued at a block boundary. If such changes in D lead to an unnatural look in the vicinity of the boundaries of the divided areas, an interpolated D, obtained through interpolation executed based upon the representative adaptation factors D in the adjacent areas, may be used over a plurality of pixels present in each boundary area so as to assure continuity in D.

Since a microscope observation system is similar to that achieved in the first embodiment described in reference to FIGS. 1 and 2 is used in the embodiment, a repeated explanation is not provided.

Figure 14:
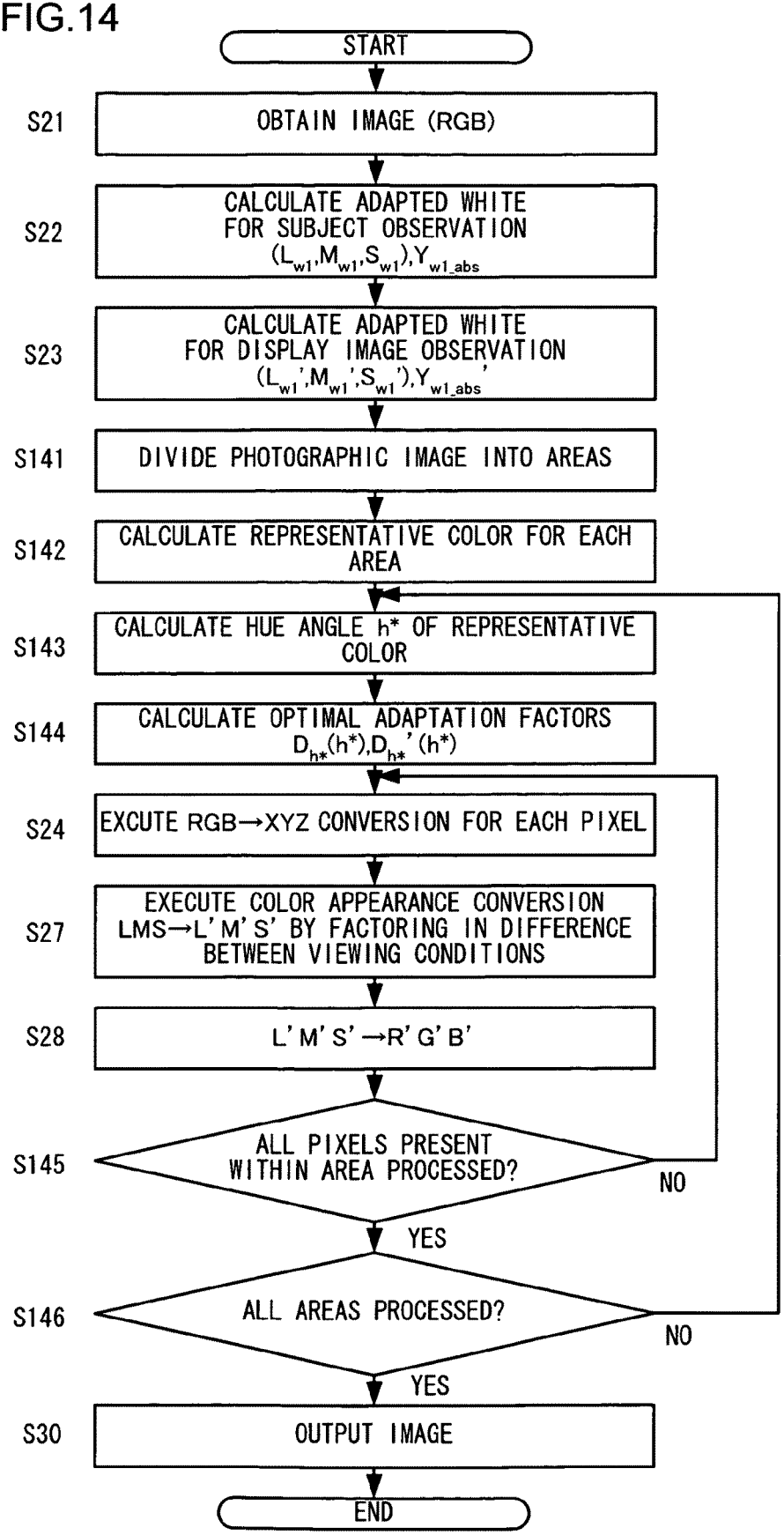
FIG. 14 shows a flowchart of the processing executed in the digital camera 2 in a sixth embodiment.

FIG. 14 presents a flowchart of the processing executed in the digital camera 2 in the sixth embodiment.

Since the processing executed in steps S21~S23 is similar to that executed in the fourth embodiment (see FIG. 12), a repeated explanation is not provided.

In step S141, the photographic image is divided into a plurality of image areas. The photographic image may be divided into, for instance, block areas or into a plurality of closed spaces determined through edge extraction and a space outside the closed spaces in this step. In step S142, the representative color for each area is determined. The color extracted from a pixel present near the center of the area, the color representing the average of the pixel values at the pixels within the area or a color appearing frequently within the area may be designated as the representative color.

In step S143, the hue angle h* of the representative color is calculated. In step S144, adaptation factors $D_{h*}$ (h*) and $D_{h*}'$ (h*) that may be adopted in conjunction with the pixels in the area are calculated based upon the hue angle h* of the representative color. Namely, a two-dimensional distribution of the adaptation factors $D_{h*}$ (h*) and $D_{h*}'$ (h*) is calculated.

Since the processing executed in steps S124~S128 is similar to that executed in the fourth embodiment (see FIG. 12), a repeated explanation is not provided. $D_{h*}$ (h*) and $D_{h*}'$ (h*) having been calculated in correspondence to each conversion target area or $D_{h*}$ (h*) and $D_{h*}'$ (h*) determined through interpolation executed by using representative colors of neighboring areas should be used as the adaptation factors when executing the color conversion on the individual pixels.

In step S145, a decision is made as to whether or not the conversion on all the pixels present in the area has been completed and if a negative decision is made, the operation returns to step S24 to continuously execute the processing. If an affirmative decision is made, the operation proceeds to step S146. In step S146, a decision is made as to whether or not all the areas defined by dividing the photographic image have undergone the processing in steps S143~S145. If a negative decision is made, the operation returns to step S143 to continuously execute the processing. If an affirmative decision is made, however, the operation proceeds to step S30 to output the image before ending the processing.

As described above, the optimal adaptation factors corresponding to the representative color are determined for each area. Since this eliminates the need to judge the hue of each pixel, the processing is simplified. Furthermore, since the color conversion is executed by using the optimal adaptation factors corresponding to the color best representing the conversion target pixel, the exact color appearance can be reproduced.

(Variation of the Sixth Embodiment)

Figure 15:
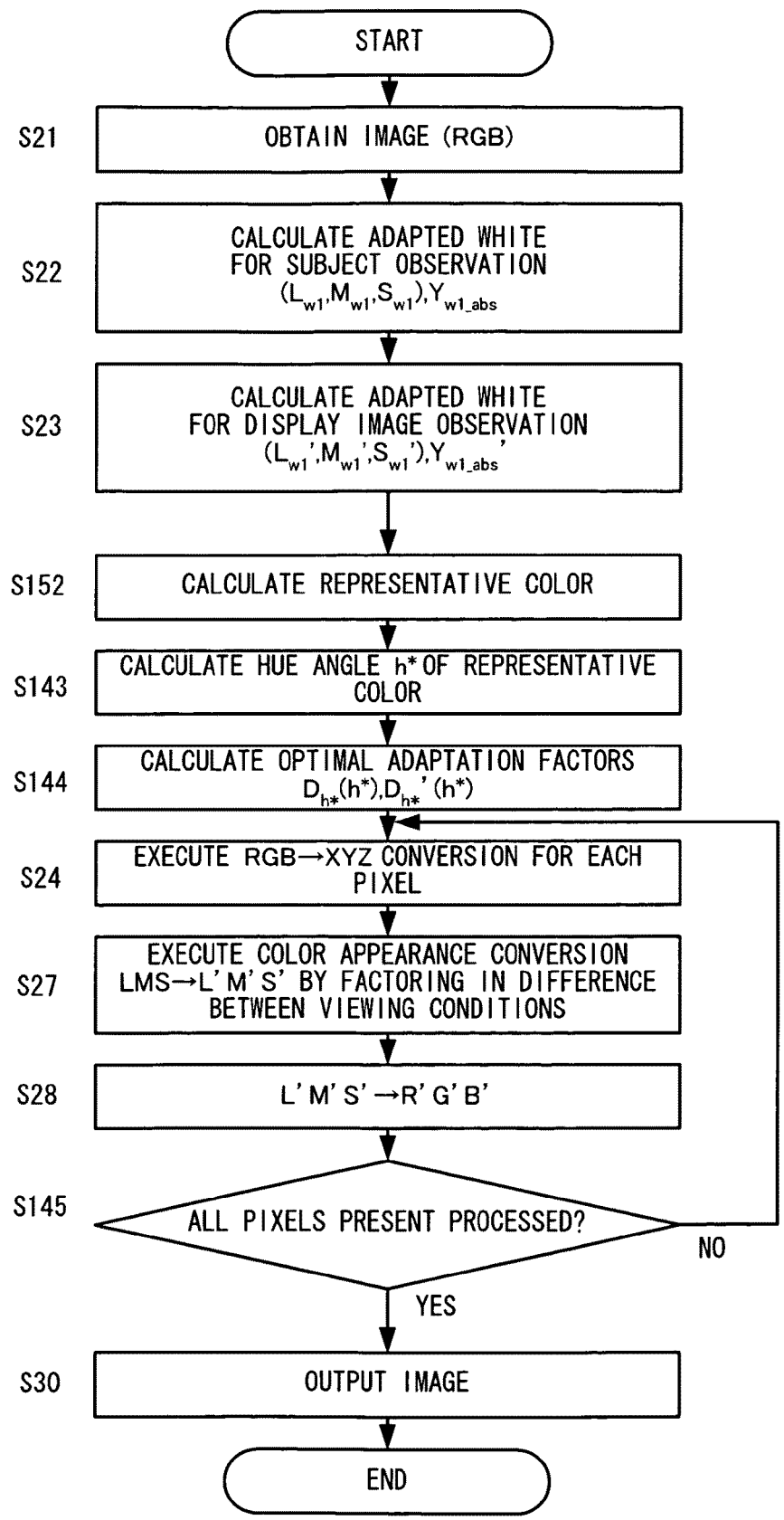
FIG. 15 shows a flowchart of the processing executed in the digital camera 2 in a variation of the sixth embodiment.

Instead of dividing the image into areas in step S141, a single representative color representing the color of the entire image may be determined. FIG. 15 presents a flowchart of the processing executed in the digital camera 2 in the variation.

Since the processing executed in steps S21~S23 is similar to that executed in the fourth embodiment (see FIG. 12), a repeated explanation is not provided. In step S152, the representative color representing the entire image is determined. Since the representative color may be determined as in step S142 in the sixth embodiment (see FIG. 14), a repeated explanation is not provided. Since the processing executed in steps S143~S144, S24, S27 and S28 is similar to that executed in the sixth embodiment (see FIG. 14), a repeated explanation is not provided.

In step S145, a decision is made as to whether or not the conversion on all the pixels has been completed and if a negative decision is made, the operation returns to step S24 to continuously execute the processing. If an affirmative decision is made, however, the operation proceeds to step S30 to output the image before ending the processing. Since even the need to judge the hue of each area is eliminated, the processing can be further simplified.

While the processing achieved in the first embodiment is executed by taking into consideration adaptation factors in the fourth through sixth embodiment described above, the processing achieved in the second and third embodiments, too, may be executed by taking into consideration adaptation factors.

-Variations-

It is to be noted that the embodiments described above allow for the following variations.

(1) The von Kries chromatic adaptation expression is used as the chromatic adaptation transform model in the embodiments described above. As an alternative, another color appearance model, such as the CIECAM02, may be utilized. In conjunction with the CIECAM02 model, tri-stimulus values ($X_W$, $Y_W$, $Z_W$) of the imaging operation illumination white point and tri-stimulus values ($X_W'$, $Y_W'$, $Z_W'$) of the observation illumination white point, converted respectively from the subject observation adapted white point ($L_{W1}$, $M_{W1}$, $S_{W1}$) and the display image observation adapted white point ($L_{W1}'$, $M_{W1}'$, $S_{W1}'$) ascertained in the first embodiment may be utilized.

In addition, the adapted white point and the luminance level in case that visual perception is adapted during the subject observation, and the adapted white point and the luminance level in case that visual perception is adapted during the display image observation, to be used in processing other than a chromatic adaptation transform, may be determined by factoring in the influences of the different viewing environments on each other.

(2) While an explanation is given above in reference to the embodiments on an example in which CAT02 is used as the conversion matrix when converting the colorimetric value data XYZ to the cone response LMS data, the conversion may instead be executed by using another color space such as the Bradford.

(3) An explanation is given above in reference to the embodiments on an example in which the entire process including the photographing operation through the image processing is executed within the digital camera 2. However, an image photographed with the digital camera 2 and read into a personal computer may undergo image processing within the personal computer based upon an application program installed in the personal computer. In such a case, the image processing is executed by using the personal computer monitor.

Figure 16:
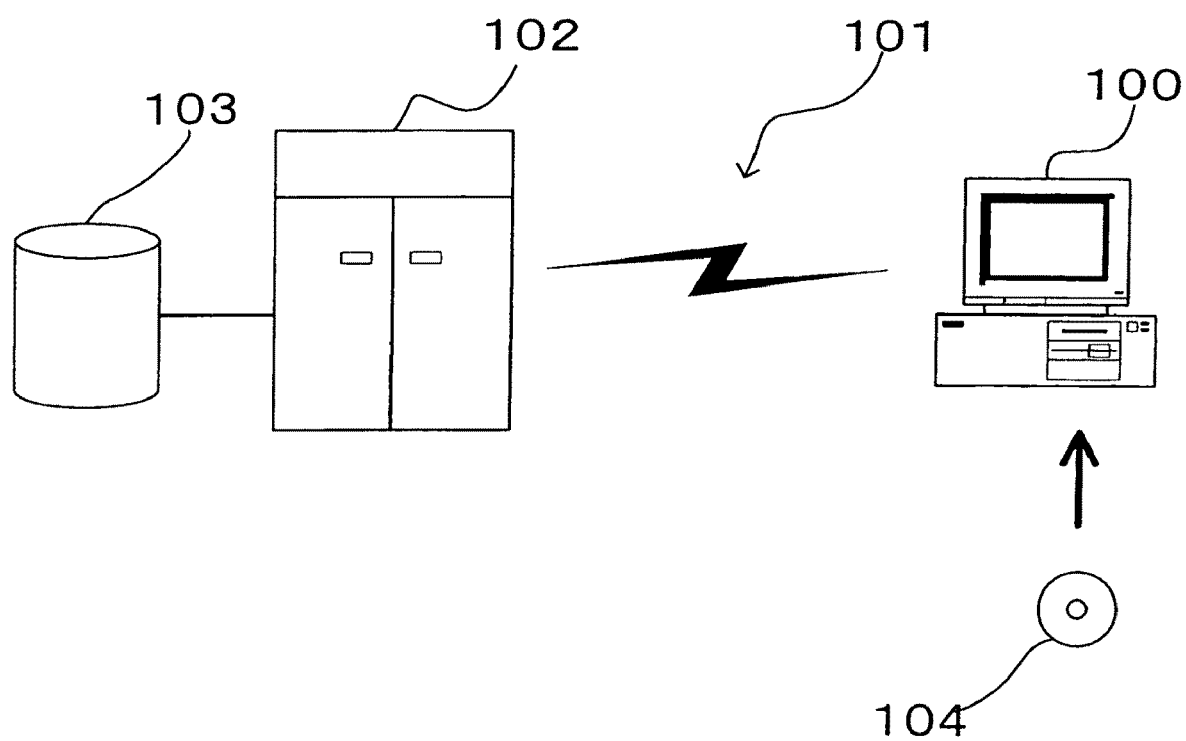
FIG. 16 shows an illustration showing how the program may be provided to a personal computer 100.

Any of the programs explained in reference to the embodiments may be provided in a recording medium such as a CD-ROM or as data signals on the Internet or the like to enable a personal computer to execute the image processing. FIG. 16 illustrates how the image processing program may be provided to a personal computer 100. The personal computer 100 receives the program via a CD-ROM 104. In addition, the personal computer 100 has a function enabling it to connect with a communication line 101. A computer 102 is a server computer that provides the program stored in a recording medium such as a hard disk 103. The communication line 101 may be a communication network such as the Internet or a dedicated communication network. The computer 102 reads out the program from the hard disk 103 and transmits the program thus readout to the personal computer 100 via the communication line 101. Namely, the program embodied as a data signal is transmitted on a carrier wave via the communication line 101. The program can thus be distributed as a computer-readable computer program product assuming any of various modes including a recording medium, a data signal (a carrier wave) and the like.

(4) While an explanation is given above in reference to the embodiments on an example in which the temporal adaptation levels $R_{tmp}$ and $R_{tmp}'$ are determined for the two primary observation modes that may be assumed with regard to the subject observation and the display image observation, i.e., an observation mode in which the display image alone is observed and a combination observation mode in which the subject is directly observed and also the display image is observed, $R_{tmp}$ may assume a value other than the two values described above and it may be set to any value within the range of 0.0~1.0 in correspondence to the predicted observation mode. In addition, while the embodiments are described by assuming that $R_{tmp}=R_{tmp}'$ in either mode, optimal values may be selected by assuming that $R_{tmp} \neq R_{tmp}'$ depending upon the observation method.

(5) Instead of separately defining the microscope observation temporal adaptation level $R_{tmp}$ and the monitor display image observation temporal adaptation level $R_{tmp}'$, a single value $R_{tmp}$ may be input by assuming that $R_{tmp} \approx R_{tmp}'$ is true at all times.

(6) While an explanation is given above in reference to the embodiments on an example in which an image captured with the digital camera 2 is brought up on display at the monitor 3, the present invention may be adopted when observing a printout of an image output from a printer instead of the image displayed at the monitor 3. Namely, the present invention may be adopted when the observer looks back and forth between the subject observed with the naked eye and a printout of the image output from a printer.

(7) While one of the three types of images; an image for simultaneous observation, an image to be saved and an image to be observed at a remote location, is specified via the subject/display image observation method input unit 36 in the first and fourth through sixth embodiments, a fourth mode, i.e., an image for print out, may be added as another option. In such a case, if an "image for print out" is specified, the image display illumination condition acquisition unit 34 and the display image observation ambient light condition acquisition unit 35 may ascertain the illumination conditions under which the printed image to be observed is illuminated, based upon information input by the user.

(8) A specific display image observation method may be selected in the second embodiment from three different modes including a mode in which an image printout is observed. In such a case, both the image display illumination condition and the display image observation ambient light condition may assume a white point color temperature of D50 representing a normal printout viewing condition. In addition, the brightness is set to a high level so as to approximate a typical office environment. While two temporal adaptation level modes are available in conjunction with monitor observation, a selection should be made in a similar manner when the image printout is observed, from two different temporal adaptation level modes, i.e., "printout observation in combination with microscope observation" and "observation of the printout image alone or for image save".

(9) An explanation is given above in reference to the first, second and fourth through sixth embodiments on how the appearance of the color of an image displayed at the monitor 3 can be rendered to accurately match the appearance of the color of the subject observed through the microscope and an explanation is given above in reference to the third embodiment on how the appearance of the color of an image displayed at the monitor 3 can be rendered to accurately match the appearance of the color of the target object placed on the desktop. Any of such methods can also be adopted when accurately matching the color appearance of an image displayed at the monitor 3 with the appearance of the color of an image of the same target project cast via a projector or when matching the color appearance of the image displayed at the monitor 3 with the appearance of the color of an image of the same target object printed out via a printer. Namely, the present invention may be adopted whenever the appearances of the colors of images observed in different observation environments must be matched, i.e., whenever accurate color reproduction needs to be achieved for images observed in different observation environments.

A method that may be adopted to match the appearance of an image displayed at the monitor 3 with the appearance of the color of an image projected via a projector is now described in reference to FIG. 3 illustrating the first embodiment. Color matching for a monitor image and a projector image may be achieved by modifying the processing executed by the subject illumination condition acquisition unit 32 and the subject observation ambient light condition acquisition unit 33 in FIG. 3 to processing similar to that executed by the image display illumination condition acquisition unit 34 and the display image observation ambient light condition acquisition unit 35 in FIG. 3 and modifying the processing executed by the image display illumination condition acquisition unit 34 and the display image observation ambient light condition acquisition unit 35 in FIG. 3 to processing for ascertaining the illumination condition and the ambient light condition in the projector environment.

The projector image observation condition differs from the monitor observation condition in that no standard viewing condition can be defined in correspondence to the projector image observation condition. Accordingly, the image illumination condition acquisition unit 34 may ascertain the illumination condition in a manner similar to that adopted by the display image observation ambient light condition acquisition unit 35. Namely, a menu in which the observer is able to specify the projector illumination type (color temperature) and luminance, may be brought up on display at the monitor 3 so as to allow the observer to specify the projector illumination type (color temperature) and the projector luminance with the mouse 5. For instance, the menu may list a plurality of predicted color temperatures, e.g., 9000K, 6500K, 5000K and 4000K indicating different illumination types (color temperatures), and a plurality of light level settings (bright, normal, etc.), and the observer may specify a specific illumination type and a specific luminance via the mouse 5. Once the illumination color temperature is specified, the color temperature of the light source can be determined and the white point $(X_W', Y_W', Z_W')$ can thus be determined. In addition, the absolute luminance $Y_{W\_abs}'$ of the illumination can be estimated based upon the light level, e.g., "bright" or "normal", specified by the observer. The ambient light condition may be ascertained through a method similar to that adopted by the display image observation ambient light condition acquisition unit 35 in the first embodiment.

In addition, the observer (user) may be allowed to specify via a menu screen or the like that the display image displayed via the projector is an image to be observed while concurrently observing the display image at the monitor, that the projector display image is an image to be saved or that the projector display image is to be observed by itself at a remote location away from the monitor 3 via an input unit equivalent to the subject/display image observation method input unit 36 in FIG. 3.

(10) Observation in a projector environment such as that described above may be incorporated in any of the microscope observation systems achieved in the first, second and fourth through sixth embodiments described above or in the desktop work system achieved in the third embodiment. Namely, color appearance matching for three or more observation environments may be realized by adopting the concept described in detail in reference to the embodiments.

(11) A method that may be adopted to match the appearance of a printed image (printout) with the appearance of the color of an image displayed at the monitor 3 is now described in reference to FIG. 3 illustrating the first embodiment. Color matching for a monitor image and a printed image may be achieved by modifying the processing executed by the subject illumination condition acquisition unit 32 and the subject observation ambient light condition acquisition unit 33 in FIG. 3 to processing similar to that executed by the image display illumination condition acquisition unit 34 and the display image observation ambient light condition acquisition unit 35 in FIG. 3 and modifying the processing executed by the image display illumination condition acquisition unit 34 and the display image observation ambient light condition acquisition unit 35 in FIG. 3 to processing for ascertaining the illumination condition and the ambient light condition in the print viewing condition.

Based upon the results of selections made by the user in a menu screen, the image display illumination condition acquisition unit 34 may ascertain the print viewing condition illumination conditions, i.e., the white point $(X_W', Y_W', Z_W')$ and the absolute luminance $Y_{W\_abs}'$ of the illumination illuminating the printout in the print viewing condition. Since the ambient light condition in the print viewing condition is identical to the print viewing condition illumination condition, the display image observation ambient light condition acquisition unit 35 is able to ascertain the ambient light white point $(X_{SW}', Y_{SW}', Z_{SW}')=(X_W', Y_W', Z_W')$ and the ambient light absolute luminance $Y_{SW\_abs}'=Y_{W\_abs}'$ by referencing the values obtained by the image display illumination condition acquisition unit 34.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope and teaching of the invention.

What is claimed is:

1. An image processing device that reproduces under a second observation condition an appearance of a color of a subject as perceived under a first observation condition, comprising:
   an image data acquisition unit that obtains first image data created by capturing a subject image under the first observation condition;
   a first illumination condition acquisition unit that obtains information related to a first illuminating light source used under the first observation condition;
   a second illumination condition acquisition unit that obtains information related to a second illuminating light source used under the second observation condition;
   a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation condition in addition to information related to an illuminating light source used under the one observation condition; and
   a color conversion unit that executes color conversion to convert the first image data to second image data to be used to reproduce, under the second observation condition, the appearance of the color of the subject as perceived under the first observation condition, based upon the characteristic quantity having been calculated,
   wherein:
   the characteristic quantity is an adapted white point;
   the characteristic quantity calculation unit is an adapted white point calculation unit that calculates a white point in case that visual perception is adapted under an observation condition that is at least one of the first observation condition and the second observation condition by taking into consideration the information related to the illuminating light source used under the other observation condition in addition to the information related to the illuminating light source used under the one observation condition;
   the adapted white point calculation unit calculates as the adapted white point at least a first adapted white point in case that visual perception is adapted under the first observation condition by taking into consideration the information related to the second illuminating light source having been obtained in addition to the information related to the first illuminating light source having been obtained; and
   the color conversion unit executes color conversion to convert the first image data to the second image data based upon the first adapted white point thus calculated.

2. The image processing device according to claim 1, wherein:
   the information related to the first illuminating light source includes information related to a color temperature of the first illuminating light source; and
   the information related to the second illuminating light source includes information related to a color temperature of the second illuminating light source.

3. The image processing device according to claim 2, wherein at least one of the first illumination condition acquisition unit and the second illumination condition acquisition unit selects one of a plurality of predicted ambient light conditions.

4. The image processing device according to claim 1, wherein:
   the information related to the first illuminating light source farther includes information indicating a luminance of the first illuminating light source; and
   the information related to the second illuminating light source further includes information indicating a luminance of the second illuminating light source.

5. The image processing device according to claim 4, wherein at least one of the first illumination condition acquisition unit and the second illumination condition acquisition unit selects one of a plurality of predicted ambient light conditions.

6. The image processing device according to claim 1, wherein:
   the information related to the first illuminating light source includes information related to a light source that directly illuminates the subject and information related to a light source that illuminates an environment of the subject; and the information related to the second illuminating light source includes information related to a light source of a display device at which the second image data are displayed and information related to a light source that illuminates an environment of the display device.

7. The image processing device according to claim 1, further comprising:
a first display device at which the image is displayed under the first observation condition; and
a second display device at which a reproduced image is displayed under the second observation condition,
wherein:
the information related to the first illuminating light source includes information related to a light source of the first display device and information related to a light source that illuminates an environment of the first display device; and
the information related to the second illuminating light source includes information related to a light source of the second display device and information related to a light source that illuminates an environment of the second display device.

8. The image processing device according to claim 1, wherein at least one of the first illumination condition acquisition unit and the second illumination condition acquisition unit selects one of a plurality of predicted ambient light conditions.

9. The image processing device according to claim 1, further comprising:
an adaptation factor calculation unit that calculates an adaptation factor indicating an extent of adaptation to an illumination condition adopted under the first observation condition,
wherein:
the adapted white point calculation unit calculates the adapted white point in case that visual perception is adapted under the first observation condition by using the adaptation factor calculated by the adaptation factor calculation unit; and
the adaptation factor calculation unit analyzes a color distribution in the input image and adjusts the adaptation factor based upon the color distribution determined through analysis.

10. The image processing device according to claim 1, further comprising:
an adaptation factor calculation unit that calculates an adaptation factor indicating an extent of adaptation to an illumination condition adopted under the second observation condition,
wherein:
the adapted white point calculation unit calculates the adapted white point in case that visual perception is adapted under the second observation condition by using the adaptation factor calculated by the adaptation factor calculation unit; and
the adaptation factor calculation unit analyzes a color distribution in the input image and adjusts the adaptation factor based upon the color distribution determined through analysis.

11. The image processing device according to claim 1, further comprising:
an adaptation factor calculation unit that calculates an adaptation factor indicating an extent of adaptation to an illumination condition adopted under the first observation condition and an adaptation factor indicating an extent of adaptation to an illumination condition adopted under the second observation condition,
wherein:
the adapted white point calculation unit calculates the adapted white points respectively in cases that visual perception is adapted under the first observation condition and the second observation condition by using the adaptation factors calculated by the adaptation factor calculation unit; and
the adaptation factor calculation unit analyzes a color distribution in the input image and adjusts the adaptation factors based upon the color distribution determined through analysis.

12. The image processing device according to claim 1, wherein the first image data obtained by the image data acquisition unit are image data generated by capturing a microscope image.

13. An image processing device that reproduces under a second observation condition an appearance of a color of a subject as perceived under a first observation condition, comprising:
an image data acquisition unit that obtains first image data created by capturing a subject image under the first observation condition;
a first illumination condition acquisition unit that obtains information related to a first illuminating light source used under the first observation condition;
a second illumination condition acquisition unit that obtains information related to a second illuminating light source used under the second observation condition;
a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation condition in addition to information related to an illuminating light source used under the one observation condition; and
a color conversion unit that executes color conversion to convert the first image data to second image data to be used to reproduce, under the second observation condition, the appearance of the color of the subject as perceived under the first observation condition, based upon the characteristic quantity having been calculated,
wherein:
the characteristic quantity is an adapted white point;
the characteristic quantity calculation unit is an adapted white point calculation unit that calculates a white point in case that visual perception is adapted under an observation condition that is at least one of the first observation condition and the second observation condition by taking into consideration the information related to the illuminating light source used under the other observation condition in addition to the information related to the illuminating light source used under the one observation condition;
the adapted white point calculation unit calculates as the adapted white point at least a second adapted white point in case that visual perception is adapted under the second observation condition by taking into consideration the information related to the first illuminating light source having been obtained in addition to the information related to the second illuminating light source having been obtained; and the color conversion unit executes color conversion to convert the first image data to the second image data based upon the second adapted white point thus calculated.

14. The image processing device according to claim 13, wherein:
the information related to the first illuminating light source includes information related to a color temperature of the first illuminating light source; and
the information related to the second illuminating light source includes information related to a color temperature of the second illuminating light source.

15. The image processing device according to claim 13, wherein:
the information related to the first illuminating light source further includes information indicating a luminance of the first illuminating light source; and
the information related to the second illuminating light source further includes information indicating a luminance of the second illuminating light source.

16. The image processing device according to claim 13, wherein at least one of the first illumination condition acquisition unit and the second illumination condition acquisition unit selects one of a plurality of predicted ambient light conditions.

17. The image processing device according to claim 13, further comprising:
an adaptation factor calculation unit that calculates an adaptation factor indicating an extent of adaptation to an illumination condition adopted under the first observation condition,
wherein:
the adapted white point calculation unit calculates the adapted white point in case that visual perception is adapted under the first observation condition by using the adaptation factor calculated by the adaptation factor calculation unit; and
the adaptation factor calculation unit analyzes a color distribution in the input image and adjusts the adaptation factor based upon the color distribution determined through analysis.

18. The image processing device according to claim 13, further comprising:
an adaptation factor calculation unit that calculates an adaptation factor indicating an extent of adaptation to an illumination condition adopted under the second observation condition,
wherein:
the adapted white point calculation unit calculates the adapted white point in case that visual perception is adapted under the second observation condition by using the adaptation factor calculated by the adaptation factor calculation unit; and
the adaptation factor calculation unit analyzes a color distribution in the input image and adjusts the adaptation factor based upon the color distribution determined through analysis.

19. The image processing device according to claim 13, further comprising:
an adaptation factor calculation unit that calculates an adaptation factor indicating an extent of adaptation to an illumination condition adopted under the first observation condition and an adaptation factor indicating an extent of adaptation to an illumination condition adopted under the second observation condition,
wherein:
the adapted white point calculation unit calculates the adapted white points respectively in cases that visual perception is adapted under the first observation condition and the second observation condition by using the adaptation factors calculated by the adaptation factor calculation unit; and
the adaptation factor calculation unit analyzes a color distribution in the input image and adjusts the adaptation factors based upon the color distribution determined through analysis.

20. The image processing device according to claim 13, wherein the first image data obtained by the image data acquisition unit are image data generated by capturing a microscope image.

21. An image processing device that reproduces under a second observation condition an appearance of a color of a subject as perceived under a first observation condition, comprising:
an image data acquisition unit that obtains first image data created by capturing a subject image under the first observation condition;
a first illumination condition acquisition unit that obtains information related to a first illuminating light source used under the first observation condition;
a second illumination condition acquisition unit that obtains information related to a second illuminating light source used under the second observation condition;
a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation condition in addition to information related to an illuminating light source used under the one observation condition; and
a color conversion unit that executes color conversion to convert the first image data to second image data to be used to reproduce, under the second observation condition, the appearance of the color of the subject as perceived under the first observation condition, based upon the characteristic quantity having been calculated,
wherein:
the characteristic quantity is an adapted white point;
the characteristic quantity calculation unit is an adapted white point calculation unit that calculates a white point in case that visual perception is adapted under an observation condition that is at least one of the first observation condition and the second observation condition by taking into consideration the information related to the illuminating light source used under the other observation condition in addition to the information related to the illuminating light source used under the one observation condition;
the adapted white point calculation unit calculates, as the adapted white point, a first adapted white point in case that visual perception is adapted under the first observation condition by taking into consideration the information related to the second illuminating light source in addition to the information related to the first illuminating light source having been obtained, and a second adapted white point in case that visual perception is adapted under the second observation condition respectively by taking into consideration the information related to the first illuminating light source in addition to the information related to the second illuminating light source having been obtained; and the color conversion unit executes color conversion to convert the first image data to the second image data based upon the first adapted white point and the second adapted white point.

22. The image processing device according to claim 21, wherein:
the information related to the first illuminating light source includes information related to a color temperature of the first illuminating light source; and
the information related to the second illuminating light source includes information related to a color temperature of the second illuminating light source.

23. The image processing device according to claim 21, wherein:
the information related to the first illuminating light source further includes information indicating a luminance of the first illuminating light source; and
the information related to the second illuminating light source further includes information indicating a luminance of the second illuminating light source.

24. The image processing device according to claim 21, wherein at least one of the first illumination condition acquisition unit and the second illumination condition acquisition unit selects one of a plurality of predicted ambient light conditions.

25. The image processing device according to claim 21, further comprising:
an adaptation factor calculation unit that calculates an adaptation factor indicating an extent of adaptation to an illumination condition adopted under the first observation condition,
wherein:
the adapted white point calculation unit calculates the adapted white point in case that visual perception is adapted under the first observation condition by using the adaptation factor calculated by the adaptation factor calculation unit; and
the adaptation factor calculation unit analyzes a color distribution in the input image and adjusts the adaptation factor based upon the color distribution determined through analysis.

26. The image processing device according to claim 21, further comprising:
an adaptation factor calculation unit that calculates an adaptation factor indicating an extent of adaptation to an illumination condition adopted under the second observation condition,
wherein:
the adapted white point calculation unit calculates the adapted white point in case that visual perception is adapted under the second observation condition by using the adaptation factor calculated by the adaptation factor calculation unit; and
the adaptation factor calculation unit analyzes a color distribution in the input image and adjusts the adaptation factor based upon the color distribution determined through analysis.

27. The image processing device according to claim 21, further comprising:
an adaptation factor calculation unit that calculates an adaptation factor indicating an extent of adaptation to an illumination condition adopted under the first observation condition and an adaptation factor indicating an extent of adaptation to an illumination condition adopted under the second observation condition,
wherein:
the adapted white point calculation unit calculates the adapted white points respectively in cases that visual perception is adapted under the first observation condition and the second observation condition by using the adaptation factors calculated by the adaptation factor calculation unit; and
the adaptation factor calculation unit analyzes a color distribution in the input image and adjusts the adaptation factors based upon the color distribution determined through analysis.

28. The image processing device according to claim 21, wherein the first image data obtained by the image data acquisition unit are image data generated by capturing a microscope image.

29. An image processing device that reproduces under a second observation condition an appearance of a color of a subject as perceived under a first observation condition, comprising:
an image data acquisition unit that obtains first image data created by capturing a subject image under the first observation condition;
a first illumination condition acquisition unit that obtains information related to a first illuminating light source used under the first observation condition;
a second illumination condition acquisition unit that obtains information related to a second illuminating light source used under the second observation condition;
a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation condition in addition to information related to an illuminating light source used under the one observation condition;
a color conversion unit that executes color conversion to convert the first image data to second image data to be used to reproduce, under the second observation condition, the appearance of the color of the subject as perceived under the first observation condition, based upon the characteristic quantity having been calculated; and
an observation method input unit to which information related to a time interval elapsing between observation conducted under the first observation condition and observation conducted under the second observation condition is input,
wherein:
the characteristic quantity calculation unit adjusts a ratio, with which the information related to the illuminating light source used under the other observation condition is taken into consideration relative to the information related to the illuminating light source used under the one observation condition, in correspondence to the information input to the observation method input unit.

30. An image processing device that reproduces under a second observation condition an appearance of a color of a subject as perceived under a first observation condition. comprising:
an image data acquisition unit that obtains first image data created by capturing a subject image under the first observation condition;

a first illumination condition acquisition unit that obtains information related to a first illuminating light source used under the first observation condition;

a second illumination condition acquisition unit that obtains information related to a second illuminating light source used under the second observation condition;

a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation. condition in addition to information related to an illuminating light source used under the one observation condition; and a color conversion unit that executes color conversion to convert the first image data to second image data to be used to reproduce, under the second observation condition, the appearance of the color of the subject as perceived under the first observation condition, based upon the characteristic quantity having been calculated, wherein:

the characteristic quantity is an adapted white point;

the characteristic quantity calculation unit is an adapted white point calculation unit that calculates a white point in case that visual perception is adapted under an observation condition that is at least one of the first observation condition and the second observation condition by taking into consideration the information related to the illuminating light source used under the other observation condition in addition to the information related to the illuminating light source used under the one observation condition; and the adapted white point calculation unit adjusts a ratio, with which the information related to the illuminating light source used under the other observation condition is taken into consideration relative to the information related to the illuminating light source used under the one observation condition, in correspondence to a luminance of the first illuminating light source used under the first observation condition and a luminance of the second illuminating light source used under the second observation condition.

31. The image processing device according to claim 30, wherein at least one of the first illumination condition acquisition unit and the second illumination condition acquisition unit selects one of a plurality of predicted ambient light conditions.

32. An image processing device that reproduces under a second observation condition an appearance of a color of a subject as perceived under a first observation condition, comprising:

an image data acquisition unit that obtains first image data created by capturing a subject image under the first observation condition;

a first illumination condition acquisition unit that obtains information related to a first illuminating light source used under the first observation condition;

a second illumination condition acquisition unit that obtains information related to a second illuminating light source used under the second observation condition;

a characteristic quantity calculation unit that calculates a characteristic quantity related to a state of visual perception adaptation under an observation condition that is at least one observation condition of the first observation condition and the second observation condition, by taking into consideration information related to an illuminating light source used under another observation condition in addition to information related to an illuminating light source used under the one observation condition;

a color conversion unit that executes color conversion to convert the first image data to second image data to be used to reproduce, under the second observation condition, the appearance of the color of the subject as perceived under the first observation condition, based upon the characteristic quantity having been calculated; and an observation method input unit to which information related to a time interval elapsing between observation conducted under the first observation condition and observation conducted under the second observation condition is input, wherein:

the characteristic quantity is an adapted white point;

the characteristic quantity calculation unit is an adapted white point calculation unit that calculates a white point in case that visual perception is adapted under an observation condition that is at least one of the first observation condition and the second observation condition by taking into consideration the information related to the illuminating light source used under the other observation condition in addition to the information related to the illuminating light source used under the one observation condition; and the adapted white point calculation unit adjusts a ratio, with which the information related to the illuminating light source used under the other observation condition is taken into consideration relative to the information related to the illuminating light source used under the one observation condition, in correspondence to the information input to the observation method input unit.

33. An image processing device that reproduces under a second observation condition an appearance of a color of an observation target as perceived under a first observation condition, comprising:

an image data acquisition unit that obtains first image data related to the observation target observed under the first observation condition;

a first illumination condition acquisition unit that obtains information related to a first illuminating light source used under the first observation condition;

a second illumination condition acquisition unit that obtains information related to a second illuminating light source used under the second observation condition;

a characteristic quantity calculation unit that calculates a characteristic quantity related to a state of visual perception adaptation under an observation condition that is at least one observation condition of the first observation condition and the second observation condition by taking into consideration information related to the illuminating light source used under another observation condition in addition to information related to the illuminating light source used under the one observation condition; and a color conversion unit that executes color conversion to convert the first image data to second image data to be used to reproduce, under the second observation condition, the appearance of the color of the observation target as perceived under the first observation condition, based upon the characteristic quantity having been calculated, wherein:

the characteristic quantity is an adapted white point;

the characteristic quantity calculation unit is an adapted white point calculation unit that calculates a white point in case that visual perception is adapted under an observation condition that is at least one of the first observation condition and the second observation condition by taking into consideration the information related to the illuminating light source used under the other observation condition in addition to the information related to the illuminating light source used under the one observation condition;

the adapted white point calculation unit calculates as the adapted white point at least a first adapted white point in case that visual, perception is adapted under the first observation condition by taking into consideration the information related to the second illuminating light source having been obtained in addition to the information related to the first illuminating light source having been obtained; and the color conversion unit executes color conversion to convert the first image data to the second image data based upon the first adapted white point thus calculated.

* * * * *